United States Patent
Bartholomay et al.

(10) Patent No.: US 8,069,465 B1
(45) Date of Patent: Nov. 29, 2011

(54) DEVICES, SYSTEMS, AND METHODS FOR MANAGING MULTIMEDIA TRAFFIC ACROSS A COMMON WIRELESS COMMUNICATION NETWORK

(75) Inventors: William G. Bartholomay, Orange, CT (US); Sin-Min Chang, Shelton, CT (US); Santanu Das, Monroe, CT (US); Arun Sengupta, Fairfield, CT (US)

(73) Assignee: Domanicom Corp., Newton, MA (US)

( * ) Notice: Subject to any disclaimer, the term of this patent is extended or adjusted under 35 U.S.C. 154(b) by 0 days.

(21) Appl. No.: 12/984,738

(22) Filed: Jan. 5, 2011

(51) Int. Cl.
- *H04N 7/18* (2006.01)
- *H04N 7/173* (2011.01)
- *H04J 3/17* (2006.01)
- *H04L 12/28* (2006.01)
- *H04L 12/56* (2006.01)

(52) U.S. Cl. ............ 725/116; 725/74; 725/81; 370/433; 370/395.4

(58) Field of Classification Search ............ 725/74, 725/81, 93, 95, 97, 116, 118–120, 143, 146; 370/322, 328, 329, 338, 341–343, 348, 353, 370/395.4, 395.21, 395.42; 709/204–207, 709/226, 229, 232
See application file for complete search history.

(56) References Cited

U.S. PATENT DOCUMENTS

| | | | |
|---|---|---|---|
| 6,930,598 | B2 | 8/2005 | Weiss |
| 2004/0125777 | A1* | 7/2004 | Doyle et al. ............... 370/338 |
| 2007/0195787 | A1* | 8/2007 | Alnuweiri et al. ......... 370/395.4 |
| 2008/0165789 | A1 | 7/2008 | Ansari et al. |
| 2008/0168523 | A1 | 7/2008 | Ansari et al. |
| 2008/0189774 | A1 | 8/2008 | Ansari et al. |
| 2009/0037382 | A1 | 2/2009 | Ansari et al. |
| 2010/0071053 | A1 | 3/2010 | Ansari et al. |

OTHER PUBLICATIONS

Market Overview Consumer http://www.openpeak.com/MarketOverview.php.
Market Overview Enterprise http://www.openpeak.com/MarketOverview.php.
Open Services Overview http://www.openpeak.com/OpenServices.php.
Open Services Features http://www.openpeak.com/OpenServices.php.
Set-top Integration Overview http://www.openpeak.com/SettopIntegration.php.
Set-top Integration Features http://www.openpeak.com/SettopIntegration.php.

* cited by examiner

*Primary Examiner* — Hai V Tran
(74) *Attorney, Agent, or Firm* — Atanu Das; Da Vinci IP

(57) ABSTRACT

Systems, devices, and methods are disclosed for managing multimedia traffic across a common wireless communication network. Embodiments may include content devices, end point devices, a network node, and a wireless dongle. The network node and the wireless dongle may have application functions transmitting and receiving application data streams including a video application. The video application may include a conversion engine to compress, expand, or convert video data. Further, both the network node and the wireless dongle may transmit downstream video streams and receive upstream video streams. In addition, the network node may have a master controller function and a node management function, and a dongle management function each managing video traffic streams and application data streams. In addition, the dongle management function controls admission of a video traffic stream originating from the wireless dongle to the wireless communication network.

77 Claims, 17 Drawing Sheets

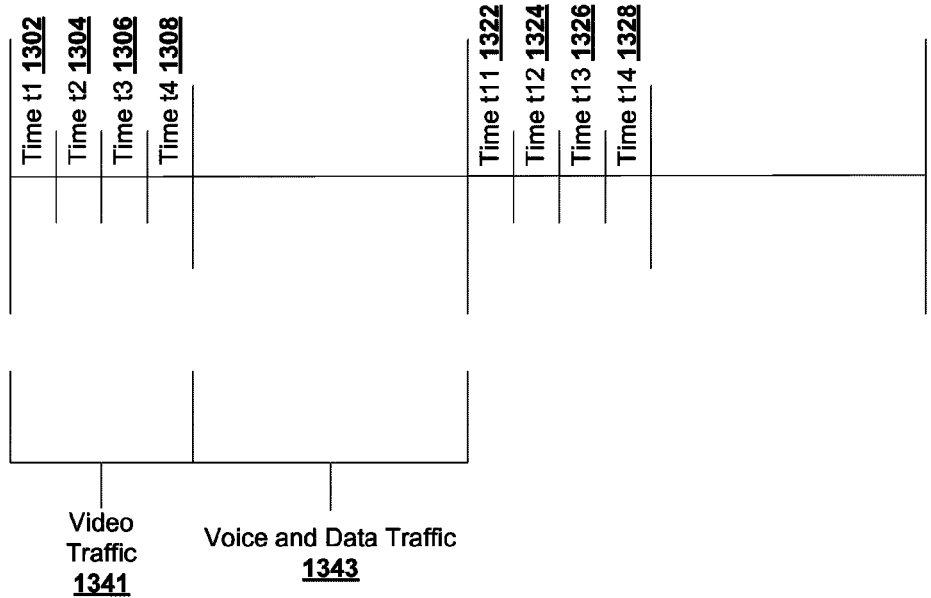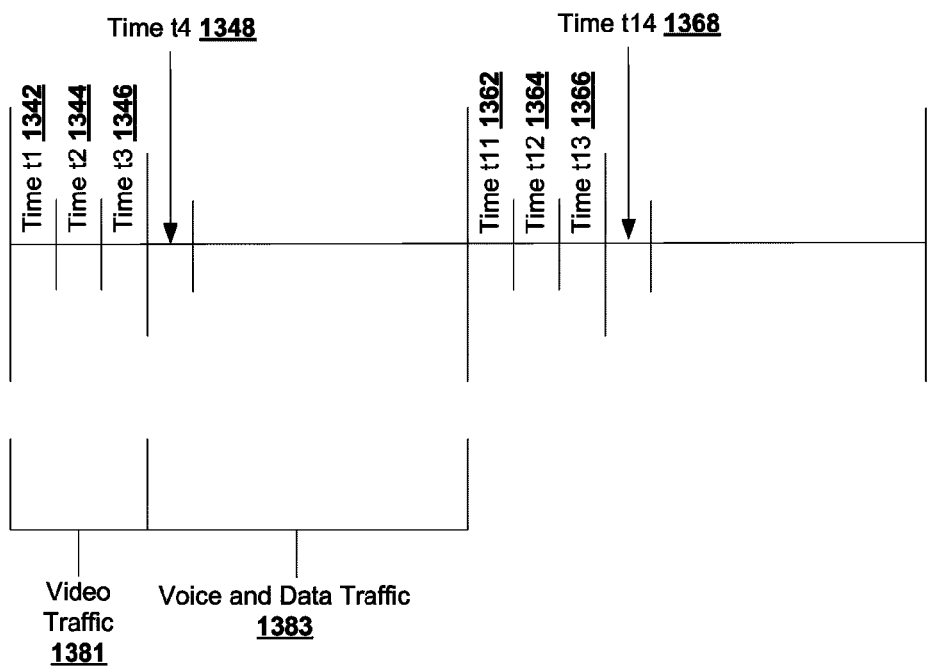
Figure 13

DEVICES, SYSTEMS, AND METHODS FOR MANAGING MULTIMEDIA TRAFFIC ACROSS A COMMON WIRELESS COMMUNICATION NETWORK

BACKGROUND

Multipoint wireless communication has become a preferred manner in which to transfer information in current technology environment. Further, multipoint wireless communication can be implemented over a variety of different using different protocols such as cellular technologies using CDMA, TDMA, or GSM technologies. Alternatively, wireless communication may be conducted using WiFi or WiMAX protocols.

WiFi has become a ubiquitous technology connecting various wireless enabled appliances in an enterprise, residential wireless environment, or public "hotspots". Further, WiFi bridges the appliances to the Internet. The users of the appliances or end point devices may support different traffic types and may access or exit the WiFi network frequently. In addition, WiFi communication networks may carry different types of information traffic such as voice traffic, video traffic, and data traffic. The video traffic may be separated into two different categories. A first category may be one-way video traffic such as viewing broadcast television content, streaming media, or IP TV. A second category may be two-way video traffic such as video conferencing. Further, the data traffic may be separated into two categories. A first category may be best effort data traffic and a second category may be background data traffic. A residential or enterprise WiFi or other type of wireless communication network may carry all or a subset of the different types of information traffic.

The previous versions of WiFi provide convenience a typical network environment such that a licensed technician is not required to install WiFi service, for example. Generally, packet drop and packet collision are not of concern because such situations are handled by either WiFi protocols or a higher layer protocol using retransmission protocols. Having such characteristics, WiFi may be suitable for data applications of which peak rates are much higher than corresponding average/mean rates. Conversely, voice traffic has a peak rate close to its average/mean rate. Alternatively, video traffic may have traffic pattern that falls in between voice traffic and data traffic.

SUMMARY

WiFi and other wireless communication networks may carry different types of information traffic including voice, video, and data. WiFi communication protocols such as the family of IEEE 802.11 standards may carry the different types of information traffic and attempt to optimize delivery based on quality of service requirements. For example, IEEE 802.11e and IEEE 802.11n specify access categories corresponding to different types of voice, video, and data traffic that may be carried on a wireless communication network such that protocols and communication mechanisms in the wireless communication network may attempt to satisfy the quality of service requirements for the different types of traffic. Further, IEEE 802.11n specifies a 2.4 GHz band as well as a 5 GHz band resulting in having more capacity than previous versions IEEE 802.11 networks. However, even with the IEEE 802.11 family of protocols, further management for the different types of traffic carried on the network may be necessary to optimize network performance as well as to satisfy service and network requirements. Further, video media content providers are offering different types of content across the Internet as well as broadcast television networks. Thus, the offering of different types of video content from different content providers and service providers coupled with the ability of wireless communication network to carry more traffic may result in more video traffic to flow across WiFi and other wireless communication networks in both residential and enterprise environments. For example, commercial and residential "hotspots" that deploy wireless communication networks providing public access to Internet and web browsing capabilities have become ubiquitous. However, current "hotspots" do not provide adequate performance for simultaneous voice, video, and data services due to lack of traffic management functions in such wireless communication networks.

IEEE 802.11e and IEEE 802.11n may specify a priority mechanism for voice, data and video traffic streams in a wireless network. However, IEEE 802.11e and IEEE 802.11n may not provide the ability to satisfy the overall performance requirements when voice, data and video traffic loads are heavy as the IEEE 802.11e and IEEE 802.11n specify the use of Carrier Sense Multiple Access/Collision Avoidance (CSMA/CA) scheme. Video and voice traffic performance is severely degraded due to collisions inherent in this scheme. Thus without an improved traffic management scheme, applications such as multiple high-definition (HD) video streams across a WiFi network implementing IEEE 802.11e or IEEE 802.11n may create an unsatisfactory user experience.

Currently and in the foreseeable future, voice traffic streams may comprise a small percentage of overall traffic in a wireless communication network (e.g. WiFi). However, video traffic streams can be a significant portion of the overall traffic in such a wireless communication network (e.g. WiFi). In the present disclosure, a traffic management scheme may be overlaid on top of a wireless communication network (e.g. WiFi implementing IEEE 802.11e or IEEE 802.11n) to manage different types of traffic including voice, video, data as well as management packets across the wireless communication network. Traffic policing and traffic shaping may also be used to regulate the data traffic (e.g. best effort data and background data) by assigning appropriate peak and mean traffic rates. Further, video packet collisions may be reduced or avoided by either changing video traffic priority or by assigning a dedicated time slot in a time division multiplexing scheme for packet transmission. In addition, a traffic management scheme may dynamically reallocate bandwidth availability among network nodes and dongles of various type of traffic transmitted across a wireless communication network. Also, security may be enhanced by implementing encryption using a pseudo-random code to particular traffic streams. Such disclosed features may be implemented by management functions residing in, as well as executed and implemented by the networks nodes and dongles. By implementing the aforementioned schemes, collisions are minimized or totally eliminated resulting in improving overall wireless network performance.

Within the embodiments described below, an exemplary system for managing one or more types of traffic over a wireless communication network is disclosed. The system may include one or more content devices, a first wireless terminal, and a second wireless terminal each coupled to the wireless communication network. The system may also include a first end point device of one or more end point devices having an end point communication interface. The system may further include a network node having one or more node communication interfaces wherein the network node is coupled to the one or more content devices and the first wireless terminal through the one or more node communication interfaces. The network node may also have one or more node application functions transmitting and receiving one or more application data streams including a node video application. The node video application includes a conversion engine and the node video application transmitting one or more downstream video streams and receiving one or more upstream video streams. The network node may further have a master controller function and a node management function each managing one or more node video traffic streams and the one or more application data streams. Further, the master controller function and the node management function transmitting the one or more downstream video streams and the one or more application data streams and receiving one or more upstream video streams and the one or more application data streams across the wireless communication network. In addition, the network node may include a common operating system performing resource management and coupled to the one or more node communication interfaces, one or more application functions, the node video application, the master controller function and the node management function.

In addition, the system may include a wireless dongle having one or more dongle communication interfaces wherein the wireless dongle is coupled to the second wireless terminal and the first end point device through the one or more dongle communication interfaces. The wireless dongle further having one or more dongle application functions transmitting and receiving one or more application data streams including a dongle video application. The dongle video application including a conversion engine the dongle video application transmitting one or more upstream video streams to and receiving one or more downstream video streams from the wireless communication network. In addition, the wireless dongle includes a dongle management function managing one or more application data streams and controlling admission of a dongle video traffic stream originating from the wireless dongle to the wireless communication network. Also, the wireless dongle may include a dongle common operating system performing resource management and coupled to the one or more dongle communication interfaces, the dongle video application and the dongle management function.

Further, the node management function and dongle management function are selected from the group consisting of priority, policing, traffic shaping, scheduling, admission control, authentication functions and dynamic administration of one or more service level agreements. In addition, the dongle management function is dynamically configured to implement quality-of-service requirements received from the master controller function. Also, the master controller and node management function provision a dongle management function application in the wireless dongle through the wireless communication network.

In addition, the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements. Further, the dongle management function manages a set of video traffic streams that includes one or more upstream video traffic streams and one or more downstream video traffic streams, and the dongle management function configures one or more upstream video traffic streams as first priority based on one or more management commands received from the node management function in the network node.

Another embodiment may include the node management function registering the first end point device of the one or more end point devices into the wireless communication network and allocating a first peak data rate and a first mean data rate to the first end point device for transmission of data from the first end point device based on one or more types of traffic flowing across the wireless communication network and one or more wireless communication network requirements. Further, the node management function reallocates a second peak data rate and a second mean data rate to the first end point device for transmission of data from the first end point device based on a change in characteristics of the one or more types of traffic flowing across the wireless communication network and a change in one or more wireless communication network requirements.

Further embodiments may include the dongle management function implementing a strict priority scheme to manage the one or more application data streams. In addition, the network node may control allocation of application data streams to the available wireless communication network bandwidth based on traffic type and characteristics of the application data streams using the master controller function and the node management function. Also, the node management function allocates a video traffic bandwidth that is a subset of the wireless communication network bandwidth for one or more video traffic streams. Further, the node management function and the dongle management function implement a time division multiplexing scheme on the video traffic bandwidth such that each of the one or more video traffic streams are assigned a time slot in the time division multiplexing scheme for transmission across the wireless communication network. Also, a time slot allocated to an inactive video traffic stream is reallocated to one or more active application data streams.

The system may also include a first terminal device traffic manager coupled to the network node and a second terminal device traffic manager coupled to the wireless dongle, each terminal device traffic manager performing traffic scheduling. Each terminal device traffic manager may include a management protocol processor that receives one or more data packets, traps one or more management protocol packets, processes the one or more management protocol packets, and transmits instructions to the wireless dongle to reallocate wireless communication network bandwidth based on processing the one or more management protocol packets, and verifies a quality-of-service for one or more transmission packets. Further, the terminal device traffic manager may include a traffic policer verifying one or more traffic streams conforming to a respective service level agreement and performing traffic shaping on the one or more traffic streams using a queue. Additionally, the terminal device traffic manager may include a scheduler engine that provides weighted round robin scheduling on scheduled traffic stream wherein weighted random early discard is performed based on excessive queue depth. Also, the terminal device traffic manager may include a management protocol responder generating one or more control packets for a management function and responding to one or more trapped management protocol packets.

Other embodiments may include the node management function and the dongle management function performing a security function using a pseudo-random code to encrypt a secured traffic stream between the network node and the wireless dongle over the wireless communication network wherein a key associated with the pseudo-random code is dynamically configured. Further, the one or more end point devices are selected from the group consisting of a personal computer, smartphone, electronic reader, television, video camera, and a wireless enabled appliance. In addition, the one or more application data streams is selected from the group consisting of voice traffic, video traffic, best effort data traffic, and background data traffic. Also, the one or more content devices may include a cable modem, a DSL modem, a WiMax access device, a Passive Optical Networking access device, an Optical Networking Terminal, an Optical Networking Unit, a Long Term Evolution wireless access device, a satellite access device, a broadband access device, a set-top box, a DVR, a DVD player, a BluRay player, and an antenna tuner.

Within the embodiments described below, an exemplary device for managing one or more types of traffic over a wireless communication network is disclosed. The device may include one or more node communication interfaces and one or more application functions transmitting one or more application data streams including a node video application. The node video application includes a conversion engine, the node video application transmitting one or more downstream video streams and receiving one or more upstream video streams. The device may include a master controller function and a node management function each managing one or more node video traffic streams and the one or more application data streams, transmitting the one or more downstream video streams and the one or more application data streams and receiving one or more upstream video streams and the one or more application data streams across the one or more node communication interfaces. The device also includes a common operating system performing resource management and coupled to the one or more node communication interfaces, one or more application functions, the node video application, the master controller function and the node management function.

In addition, the node management function is selected from the group consisting of priority, policing, traffic shaping, scheduling, admission control, authentication functions and dynamic administration of one or more service level agreements. Further, the master controller and the node management function transmit provisioning commands for a dongle management function application to the one or more node communication interfaces. Also, the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

Further, the node management function transmits registration information for a first end point device of the one or more end point devices to the one or more node communication interfaces and transmits allocation information to the node communication interface, the allocation information including a first peak data rate and a first mean data rate for the first end point device for transmission of data based on one or more types of traffic flowing across the wireless communication network and one or more wireless communication network requirements. In addition, the node management function transmits reallocation information including a second peak data rate and a second mean data rate to the one or more node communication interfaces for the first end point device for transmission of data from the first end point device based on a change in characteristics of the one or more types of traffic flowing across the wireless communication network and a change in one or more wireless communication network requirements.

Further embodiments may include the network node controlling allocation of application data streams to available wireless communication network bandwidth on traffic type and characteristics of the application data streams using the master controller function and the node management function. In addition, the node management function allocates a video traffic bandwidth that is a subset of the wireless communication network bandwidth for one or more video traffic streams, Further, the node management function implements a time division multiplexing scheme on the video traffic bandwidth such that each of the one or more video traffic streams are assigned a time slot in the time division multiplexing scheme for transmission across the wireless communication network. Also, a time slot allocated to an inactive video traffic stream is reallocated to one or more active application data streams.

Additional embodiments may include the node management function performs a security function using a pseudo-random code to encrypt a secured traffic stream wherein a key associated with the pseudo-random code is dynamically configured. In addition, the one or more end point devices are selected from the group consisting of a personal computer, smartphone, electronic reader, television, video camera, and a wireless enabled appliance. Further, the one or more application data streams is selected from the group consisting of voice traffic, video traffic, best effort data traffic, and background data traffic.

Within the embodiments described below, an exemplary device for managing one or more types of traffic over a wireless communication network is disclosed. The device may include one or more dongle communication interfaces and one or more dongle application functions transmitting and receiving one or more application data streams including a dongle video application. The dongle video application including a conversion engine the dongle video application transmitting one or more upstream video streams to and receiving one or more downstream video streams from the one or more dongle communication interfaces. Further, a dongle management function managing one or more application data streams and controlling admission of a dongle video traffic stream originating from the device to one or more dongle communication interfaces. The device may also include a dongle common operating system performing resource management and coupled to the one or more dongle communication interfaces, the dongle video application and the dongle management function.

Further, the dongle management function is selected from the group consisting of priority, policing, traffic shaping, scheduling, admission control, authentication functions and dynamic administration of one or more service level agreements. In addition, the dongle management function is dynamically configured to implement quality-of-service requirements. Also, the device receives a dongle management function application from one of the one or more dongle communication interfaces and activates the dongle management function.

In addition, the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements. Further, the dongle management function manages a set of video traffic streams that includes one or more upstream video traffic streams and one or more downstream video traffic streams, and the dongle management function configures one or more upstream video traffic streams as first priority based on one or more management commands received from the node management function in the network node.

Other embodiments may include the device receiving registration data based on the device requesting authentication and first configuration data including a first peak data rate and a first mean data rate for a first end point device of one or more end point devices from the one or more dongle communication interfaces and allocating the first peak data rate and the first mean data rate to one or more dongle communication interfaces based on one or more types of traffic flowing across the wireless communication network and one or more wireless communication network requirements. Further, the device receives second configuration data from one or more communication interfaces including a second peak data rate and a second mean data rate and reallocating a second peak data rate and a second mean data rate to the one or more dongle communication interfaces based on a change in characteristics of the one or more types of traffic flowing across the wireless communication network and a change in one or more wireless communication network requirements.

Additional embodiments may include the dongle management function implementing strict priority scheme to manage one or more dongle application traffic streams. Further, the device may implement a time division multiplexing scheme on video traffic bandwidth such that one or more video traffic streams are assigned a time slot in the time division multiplexing scheme for transmission through the one or more dongle communication interfaces. In addition, a time slot allocated to an inactive video traffic stream is reallocated to one or more application data streams Further, the dongle management function may perform a security function using a pseudo-random code to encrypt a secured traffic stream wherein a key associated with the pseudo-random code is dynamically configured. Also, the one or more application data streams is selected from the group consisting of voice traffic, video traffic, best effort data traffic, and background data traffic.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

FIG. 13 is an exemplary traffic diagram illustrating an exemplary time division traffic management scheme;

DETAILED DESCRIPTION

Figure 1:
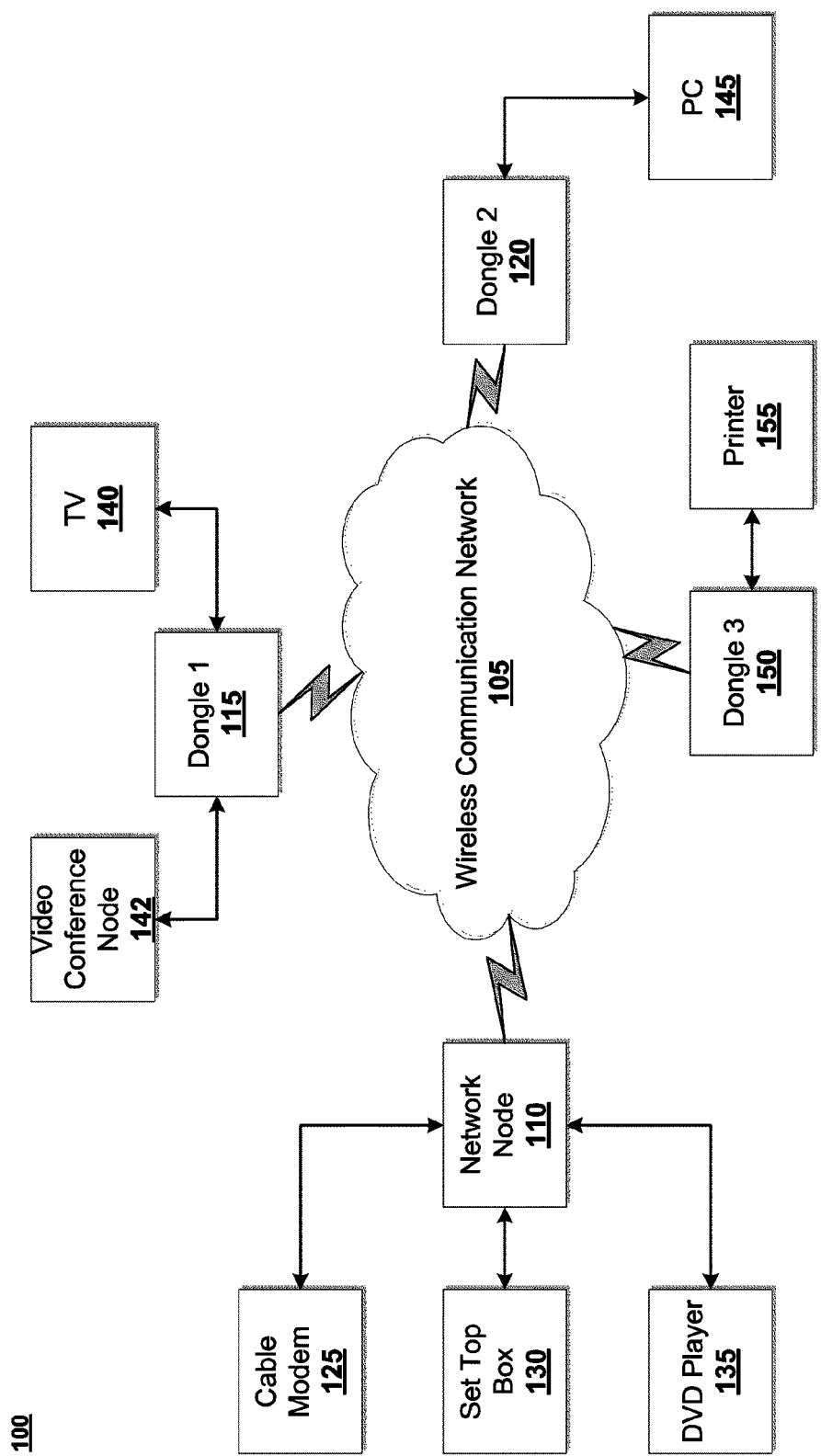
FIG. 1 is an exemplary network architecture of devices, systems, and methods for managing different types of traffic across a wireless communication network.

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

FIG. 1 is an exemplary network architecture 100 of devices, systems, and methods for managing different types of traffic across a wireless communication network 105. A network node 110, a dongle 1 (115), and a dongle 2 (120) may be coupled to the wireless communicate network 105. Further, a network node may be a secure access node that provides different services to different end point devices on the wireless communication network. In addition, the dongle 1 (115) and dongle 2 (120) may be coupled to a service multiplexer that also provides different services to different end point devices on the wireless communication network. The network node 110 may be coupled to the one or more content devices such as a cable modem 125, a set top box 130, or a DVD player 135. The one or more content devices may be coupled to a network node over a wireless communication network (e.g. WiFi) or through a wire connection. The one or more content devices may include a communication network access device such as the cable modem 125 DSL modem, WiMax access device, Passive Optical Networking (PON) access device, Optical Networking Terminal (ONT), Optical Networking Unit (ONU), Long Term Evolution (LTE) wireless access device, satellite access device, or some other broadband access device. A communication network access device may receive different types of traffic that includes voice, video, and data traffic from a communication network (e.g. Internet). The video traffic may be from an IP TV source or streaming video. Another type of content device may be a set-top device coupled to a broadcast television network (e.g. antenna/RF, cable, satellite, etc.) and receives streaming or broadcast video. An additional type of content device may be a DVD or BluRay disc player the generates and provides video content. A further type of content device may be a Digital Video Recorder (DVR) that records video content from a broadcast or streaming source (cable television source, satellite television source, etc.). The one or more content devices receive different types of traffic/content and then may provide the traffic/content to the network node. Such application traffic streams may include voice traffic, video traffic (e.g. one-way and two-way), and data traffic (best effort and background).

Dongle 1 (115) may be coupled to an end point device such as a television (TV) 140 through an HDMI interface as well as a video conference node 142. Dongle 1 (115) may receive downstream video traffic streams from the network node 110 across the wireless communication network 105 to be displayed on the TV 140. Alternatively, dongle 1 (115) may be connected to the video conference node 142 receiving downstream video traffic streams from the network node 110 across the wireless communication network 105 to be displayed on the video conference node 142. However, the dongle 1 (115) may also receive upstream video traffic streams from the video conference node 142 to be sent to the network node 110 across the wireless communication network 105.

Dongle 2 (120) may be coupled to an end point device such as a personal computer (PC) 145 through a communication interface (via a wireless or wire connection). Dongle 2 (120) may receive application traffic streams from the network node 110 across the wireless communication network 105 to be transmitted to the PC 145. Alternatively, dongle 2 (120) may receive application traffic streams from the PC 145 to be sent to the network node 110 across the wireless communication network 105.

Dongle 3 (150) may be coupled to an end point device such as a printer 155 through a communication interface (via a wireless or wire connection). Dongle 3 (150) may receive application traffic streams from different end point devices such as the PC 145 to forward to printer 155. In such embodiment, the wireless network 105 may behave as infrastructure to a multipoint communication network whereby other end point devices may communicate with each other across the wireless communication network 105. Further, network node may send dongle 3 (150) information from across the Internet via the cable modem 125. For example, a user may be outside a premises housing the printer 155. However, though a laptop computer the user may send information across the Internet through the cable modem 125, network node 110, and the wireless communication network 105 . . . to dongle 3 (150) and then to printer 155.

Each of the network node 110, a dongle 1 (115), a dongle 2 (120), and dongle 3 (150) are network devices that may have a wireless access point and traffic management functions that manage the different types traffic carried by the wireless communication network 105 details of which are explained in the present disclosure.

Figure 2:
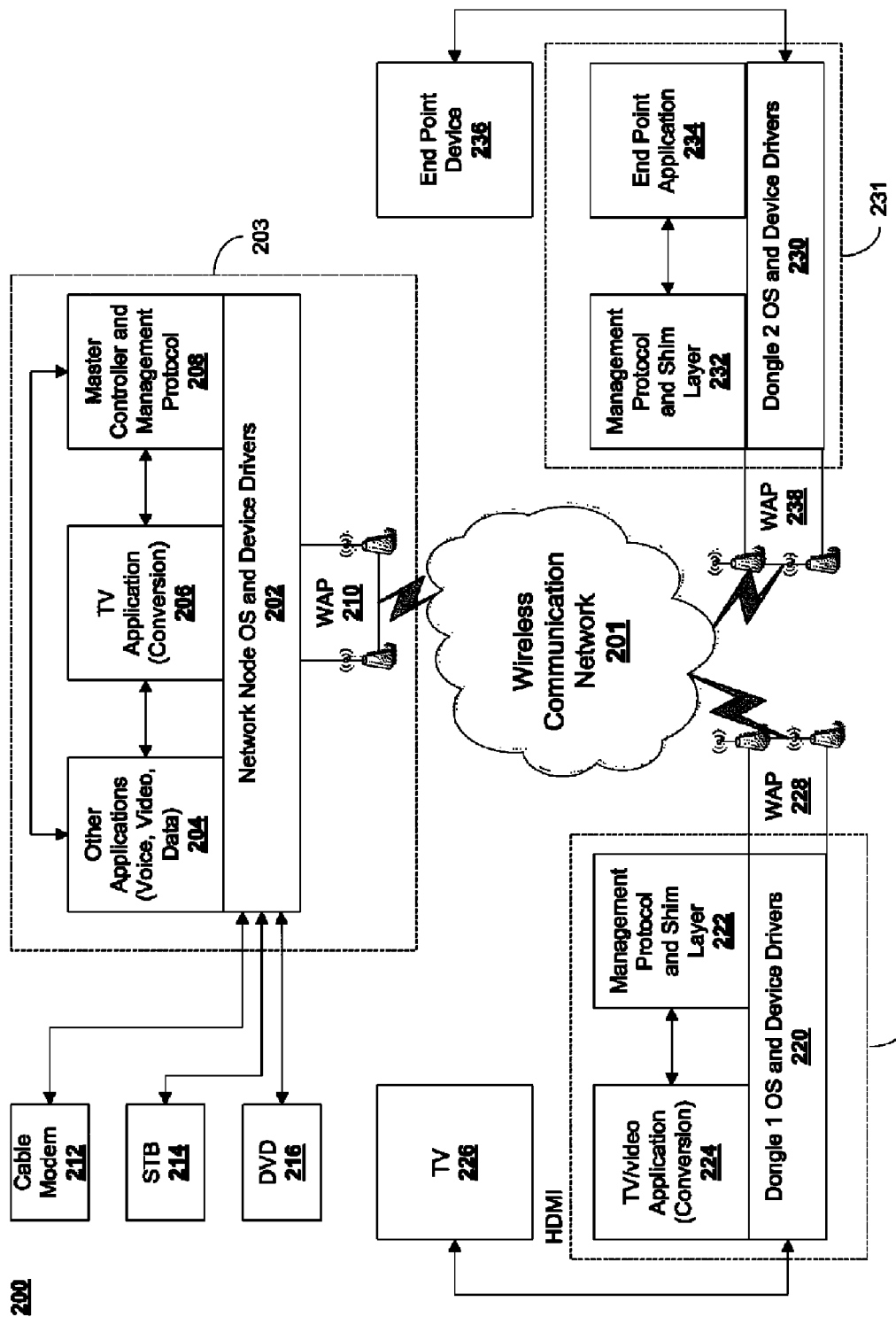
FIG. 2 is another exemplary network architecture of devices, systems, and methods for managing different types of traffic across a wireless communication network.

FIG. 2 is another exemplary network architecture 200 of devices, systems, and methods for managing different types of traffic across a wireless communication network 201. A network node 203, a dongle 1 (221), and a dongle 2 (231) may be coupled to the wireless communicate network 201. The network node 203 may be coupled to the one or more content devices such as a cable modem 212, a set top box 214, or a DVD player 216. Several different components and functions may be included in the network node 203 such as a network node operation system (OS) 202 and software functions such as a master controller function and a management protocol function (e.g. management function) 208.

Further, the network node 203 may have software applications that include a television/video application that includes a conversion engine 206. The TV application 206 may process downstream video traffic streams received from the one or more content devices by the network node 203 and transmit such downstream video traffic streams across the wireless communication network 201 to a dongle (221 and 231) coupled to an end point device. Conversely, The TV application 206 may process upstream video traffic streams received from one or more end point devices by the network node 203 from across the wireless network 201 and transmit such upstream video traffic streams to the one or more content devices (212, 216). Further, the TV application 206 may include a conversion engine that may compress, expand, or otherwise convert TV/video traffic received by the network node 203 into HDMI or other media formats known to those of ordinary skill in the art. In addition, the network node 203 may include other applications for processing other application traffic streams such as voice, video, and data received by the network node 203 from the wireless communication network 201 or the one or more content devices (212, 214, 216).

Also, the network node 203 may be coupled to a wireless access point (WAP) 210 that may couple the network node 203 to the wireless communication network 201. The WAP 210 may be a WiFi access point implementing one or more of the IEEE 802.11 protocols. The WAP 210 may be configured to be in an infrastructure mode such that the WAP 210 may serve as a base station for other communication devices (e.g. dongles, end point devices such as printers, smartphones, and personal computers, etc.) to be associated or interconnected to one another across the wireless communication network 210. The network node 203 may act as a central traffic management node for the wireless communication network 201 implementing such functions as priority designation, policing (e.g. verifying QoS requirements), traffic shaping (on every traffic stream on a traffic policing mechanism), scheduling, admission control, and authentication functions and dynamically administering one or more service level agreements. Such traffic management functions may be implemented by the master controller function and the node management function 208 in conjunction with the WAP 210.

Dongle 1 (221) may be coupled to an end point device such as a television (TV) 226 through an HDMI interface (via a wireless or wire connection). Further, Dongle 1 (221) may receive downstream video traffic streams from the network node 203 across the wireless communication network 201 to be displayed on the TV 226. Alternatively, dongle 1 (221) may be connected to another end point device (e.g. video conferencing node) and receive upstream video traffic streams to be sent to the network node 203 across the wireless communication network 201. Several different components and functions may be included in dongle 1 (221) such as a dongle operating system (OS) 220 and software functions such as a management protocol function (e.g. management function) and shim layer 222. The dongle management function 222 may incorporate a subset of the node management function 208 that may include priority designation, policing (e.g. verifying QoS requirements), traffic shaping (on every traffic stream on a traffic policing mechanism), scheduling, admission control, and authentication functions, and dynamic administration of one or more service level agreements. Further, the dongle management function 222 may communicate with the node management function 208 across the wireless network in a master and slave (command and response) paradigm to implement such traffic management functions.

Further, the dongle 1 (221) may have software applications that include a TV/video application that includes a conversion engine 224. The TV application 224 may process downstream video traffic streams received from the network node 203 and transmit such downstream video traffic streams to an end point device such as a TV 226, video conferencing node (not shown), or security camera (not shown). Conversely, The TV application 224 may process upstream video traffic streams received from one or more end point devices and dongle 1 (221) may transmit such upstream video traffic streams to the network node 203. Further, the TV application 224 may include a conversion engine that may compress, expand, or otherwise convert TV/video traffic received by dongle 1 (221) into HDMI or other media formats known to those of ordinary skill in the art. Also, dongle 1 (221) may be coupled to a wireless access point (WAP) 228 that may couple dongle 1 (221) to the wireless communication network 201. The WAP 210 may be a WiFi access point implementing one or more of the IEEE 802.11 protocols.

Dongle 2 (231) may be coupled to an end point device 236 such as a personal computer (PC) through a communication interface (via a wireless or wire connection). Dongle 2 (231) may receive application traffic streams from the network node 203 across the wireless communication network 201 to be transmitted to the PC 236. Alternatively, dongle 2 (231) may receive application traffic streams from the PC 236 to be sent to the network node 203 across the wireless communication network 201. Several different components and functions may be included in dongle 2 (231) such as a dongle operating system (OS) 230 and software functions such as a management protocol function (e.g. management function) and shim layer 232. The dongle management function 232 may incorporate a subset of the node management function 208 that may include priority designation, policing (e.g. verifying QoS requirements), traffic shaping (on every traffic stream on a traffic policing mechanism), scheduling, admission control, and authentication functions and dynamically administering one or more service level agreements. Further, the dongle management function 232 may communicate with the node management function 208 across the wireless network in a command and response paradigm to implement such traffic management functions. In addition, the dongle 2 (231) may have an end point application to process application traffic streams received and transmitted by dongle 2 (231), either to the PC 236 or the network node 203. The application traffic streams may be voice, video, or data traffic. For example, a user may implement a video chat program generating video traffic and send such video traffic to dongle 2 (231), the end point application 234 on dongle 2 (231) may process the received video traffic and the dongle management function 232 may manage the video traffic to conform with quality service requirements and wireless network requirements.

Figure 3:
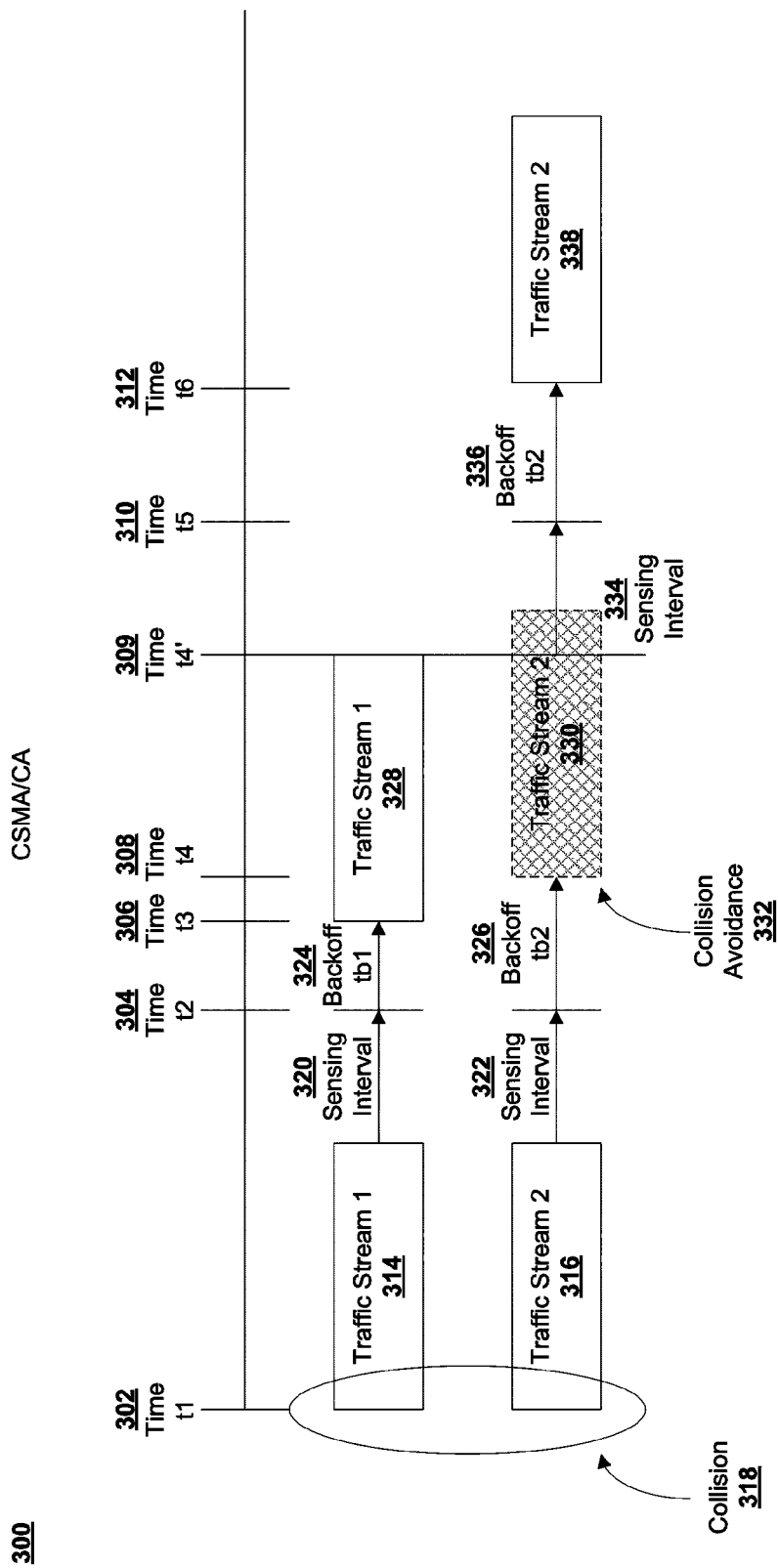
FIG. 3 is an exemplary traffic flow diagram illustrating contention of different types of traffic in a wireless communication network.

FIG. 3 is an exemplary traffic flow diagram 300 illustrating contention of different types of traffic in a wireless communication network. A WiFi network may be a wireless communication network implementing one or more protocols from the IEEE 802.11 family of protocols. Such protocols may implement a Carrier Sense Multiple Access/Collision Avoidance (CSMA/CA) scheme to resolve traffic contention issues that may arise in the wireless communication network. As persons of ordinary skill in the art would understand, a wireless communication network is a communication medium that can be shared among more than one communication device (network node, content device, dongle, end point device, etc.). Further, two or more communication devices may transmit information traffic across the wireless communication network at the same time. That is, each communication device may contend for the shared wireless medium at the same time. If so, then information packets from a traffic stream from one communication device may collide with another because each communication device shares the wireless medium. As a result of the traffic collision, the information packets from both traffic streams are corrupted and each communication device may have to resend the respective information packets. CSMA/CA is scheme to resolve such contention issues across the wireless communication network by having each communication device that transmitted a collided packet to backoff some random time so that they likelihood of collision when both communication device retransmits will be low.

In FIG. 3, a first communication device may transmit an information packet from a first traffic stream 314 at a time t1 302. Further, a second communication device may transmit an information packet from a second traffic stream 316 also at time t1 302. A collision 318 occurs as a result of such a simultaneous transmission of packets. A CSMA/CA scheme may be implemented to resolve the contention between traffic stream 1 and traffic stream 2. After detecting the collision 318, each communication device senses the shared wireless medium to detect whether another communication device is transmitting information packets. The time period for this sensing function may be called a sensing interval (320 and 322) and would last from the time detecting the collision or transmitting of the information packets (314 and 316) to a time t2 304. In addition, after the sensing interval (320 and 322) each communication device waits a respective backoff time period (324 and 326) to transmit the respective information packets.

The length of the backoff time period may depend on the type of traffic (voice, video, data). Higher priority traffic may have shorter backoff time periods resulting in a higher throughput across the wireless communication network. Conversely, lower priority traffic may have longer back off time periods resulting in lower throughput across the wireless communication network. In FIG. 3, information packets for traffic stream 2 (316, 330, 338) may have a lower priority than the information packets for traffic stream 1 (314 and 328). Thus, the backoff period tb2 326 is longer than backoff period tb1 324.

As a result, the communication device may sense no activity on the shared wireless medium after waiting a backoff tb1 time period 324 and at time t3 306 transmits an information packet 328 for traffic stream 1. After waiting a backoff time period tb2 326 at time t4 308, the communication device transmitting traffic stream 2 may sense that the shared wireless medium may be busy with the information packet 328 transmitted by the other communication device. Consequently, the communication device may restrain from sending an information packet 330 for traffic stream 2. Such an operation may be called collision avoidance in the CSMA/CA scheme. After avoiding the collision 332, the communication device waits a sensing interval 334 starting at time t4' 309 until time t5 310 to determine whether the shared wireless communication medium is busy. If not, the communication device waits backoff tb2 time period 336 before transmitting the information packet 338 at a time t6 312, if the share wireless medium is not busy, for traffic stream 2. Embodiments of the present disclosure may manage different types of traffic carried on a wireless communication network by modifying the priority of a traffic stream or modifying the backoff time period associated to a traffic stream. Note the backoff times depicted on FIG. 3 may be random such that the likelihood of collision during retransmit may be low.

Figure 4:
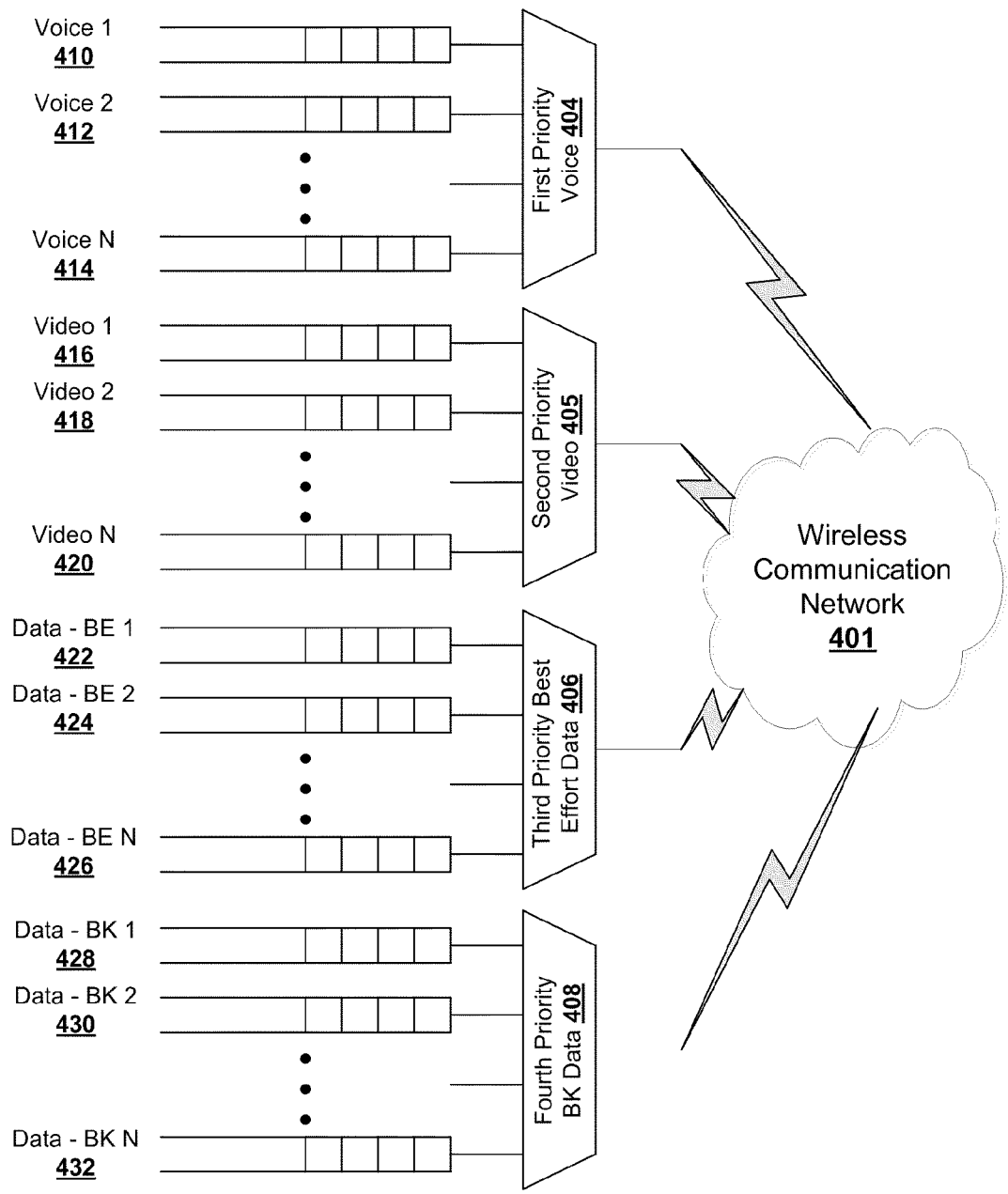
FIG. 4 is an exemplary functional block diagram illustrating an exemplary traffic priority scheme in a wireless communication network.

FIG. 4 is an exemplary functional block diagram 400 illustrating an exemplary traffic priority scheme in a wireless communication network 401. Such a traffic priority scheme 400 may be implemented within a communication device (e.g. network node, secure access node, service multiplexer, dongle, end point device, etc.) transmitting and receiving different types of traffic across the wireless communication network 401. In the traffic priority scheme 400, voice traffic may be designated or determined to be a first priority or the highest priority. A traffic scheduler 404 may be implemented in the communication device that receives N number of voice traffic streams (410, 412, 414) that are buffered in different queues. Further, video traffic may be designated or determined to be a second priority or the second highest priority. A traffic scheduler 405 may be implemented in the communication device that receives N number of video traffic streams (416, 418 420) that are buffered in different queues. In addition, best effort data traffic may be designated or determined to be a third priority or the third highest priority. A traffic scheduler 406 may be implemented in the communication device that receives N number of best effort data traffic streams (422, 424 426) that are buffered in different queues. Also, background data traffic may be designated or determined to be a fourth priority or the lowest highest priority. A traffic scheduler 408 may be implemented in the communication device that receives N number of background data traffic streams (428, 430 432) that are buffered in different queues. Persons of ordinary skill in the art would understand that the number of traffic streams for voice, video, best effort data, and background data may be different from one another.

In such a traffic management scheme 400, the communication device may transmit the voice traffic first, then video traffic, then best effort data traffic and finally background data traffic each with a distinct characteristic of deriving a respective backoff period in a WiFi CSMA/CA scheme. The embodiments may implement, for each stream of the same priority (e.g. multiplexing voice traffic streams 410, 412, 414 into voice traffic scheduler 402; multiplexing video traffic streams 416, 418, 420 into video scheduler 405; multiplexing best effort data streams 422, 424, 426 into best effort data traffic scheduler 406; multiplexing background data 428, 430, 432 into background data traffic scheduler 408), in a weighted round robin scheme by each scheduler (404-408) as known to those skilled in the art such that a subset of traffic streams with the same priority (e.g. voice) traffic streams are scheduled to be transmitted in interleaving manner with a subset of another stream (e.g. voice) traffic streams to conform to quality of service and network requirements.

Figure 5:
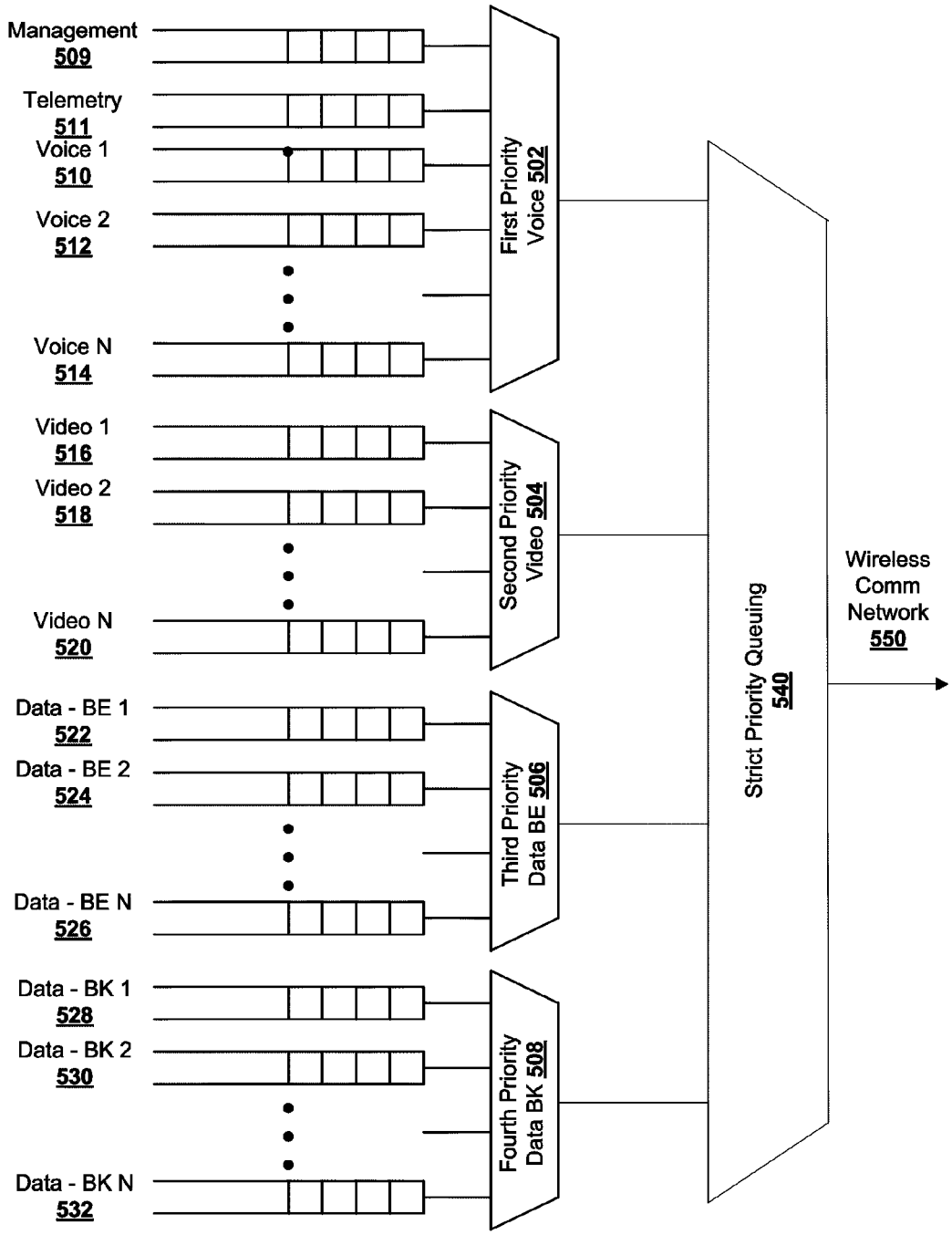
FIG. 5 is an exemplary functional block diagram illustrating an exemplary strict traffic priority scheme in a wireless communication network.

FIG. 5 is an exemplary functional block diagram illustrating an exemplary strict traffic priority 500 scheme in a wireless communication network 550 (not shown). In the traffic priority scheme 500, and similar to the traffic scheme depicted in FIG. 4, voice traffic may be designated or determined to be a first priority or the highest priority. A queue voice traffic scheduler 502 may be implemented in the communication device that receives N number of voice traffic streams (510, 512, 514) that are buffered in queues. In addition, management packets 509 and telemetry packets 511 that are transmitted, received and used by the traffic management function of the communication device may also be designated as a first priority. Further, video traffic may be designated or determined to be a second priority or the second highest priority. A video traffic scheduler 504 may be implemented in the communication device that receives N number of video traffic streams (516, 518 520) that are buffered in different queues. In addition, best effort data traffic may be designated or determined to be a third priority or the third highest priority. A best effort data traffic scheduler 506 may be implemented in the communication device that receives N number of best effort data traffic streams (522, 524 526) that are buffered in different queues. Also, background data traffic may be designated or determined to be a fourth priority or the lowest highest priority. A background data traffic scheduler 508 may be implemented in the communication device that receives N number of video traffic streams (528, 530, 552) that are buffered in different queues. Persons of ordinary skill in the art would understand that the number of traffic streams for voice, video, best effort data, and background data may be different from one another.

Each of the traffic queues (502, 504, 506, 508) may be coupled to a strict priority mechanism 540 that limits the communication device to transmit every voice traffic stream first. After each voice traffic stream has been transmitted, then, only will a video traffic stream be transmitted. Thus, generally, the strict priority mechanism allows for all higher priority traffic to be transmitted before any lower priority traffic may be transmitted to the wireless communication network 550. For example, there may be only packets buffered for the voice 1 stream (510) and the voice 2 stream (512). When implementing the strict priority scheme depicted in FIG. 5, a packet from voice stream 1 (510) may be transmitted from voice scheduler 502. Thereafter, a packet from voice stream 2 (512) may be transmitted. Thereafter, another packet from voice stream 1 (510) and then another packet from voice stream 2 (512) until all the packets buffered for voice stream 1 (510) and voice stream 2 (512) have been transmitted. Then only shall packets from the streams (516-520) from video scheduler 504 be transmitted. As a result, all of the traffic schedulers (502, 504, 506, 508) shall share the same characteristic of deriving the same backoff period. Further, such a strict priority scheme may be implemented in WiFi wireless communication network implementing the IEEE 802.11g standard. Such standard does not have categories of traffic types. Instead, a dongle implementing the strict priority scheme 500 may determine the type of traffic (e.g. voice, video, best effort data, background data, etc.) that is transiting the dongle and implement the strict priority scheme accordingly thereby satisfying quality-of-service requirements for various traffic streams traveling across the wireless communication network (550).

Figure 6:
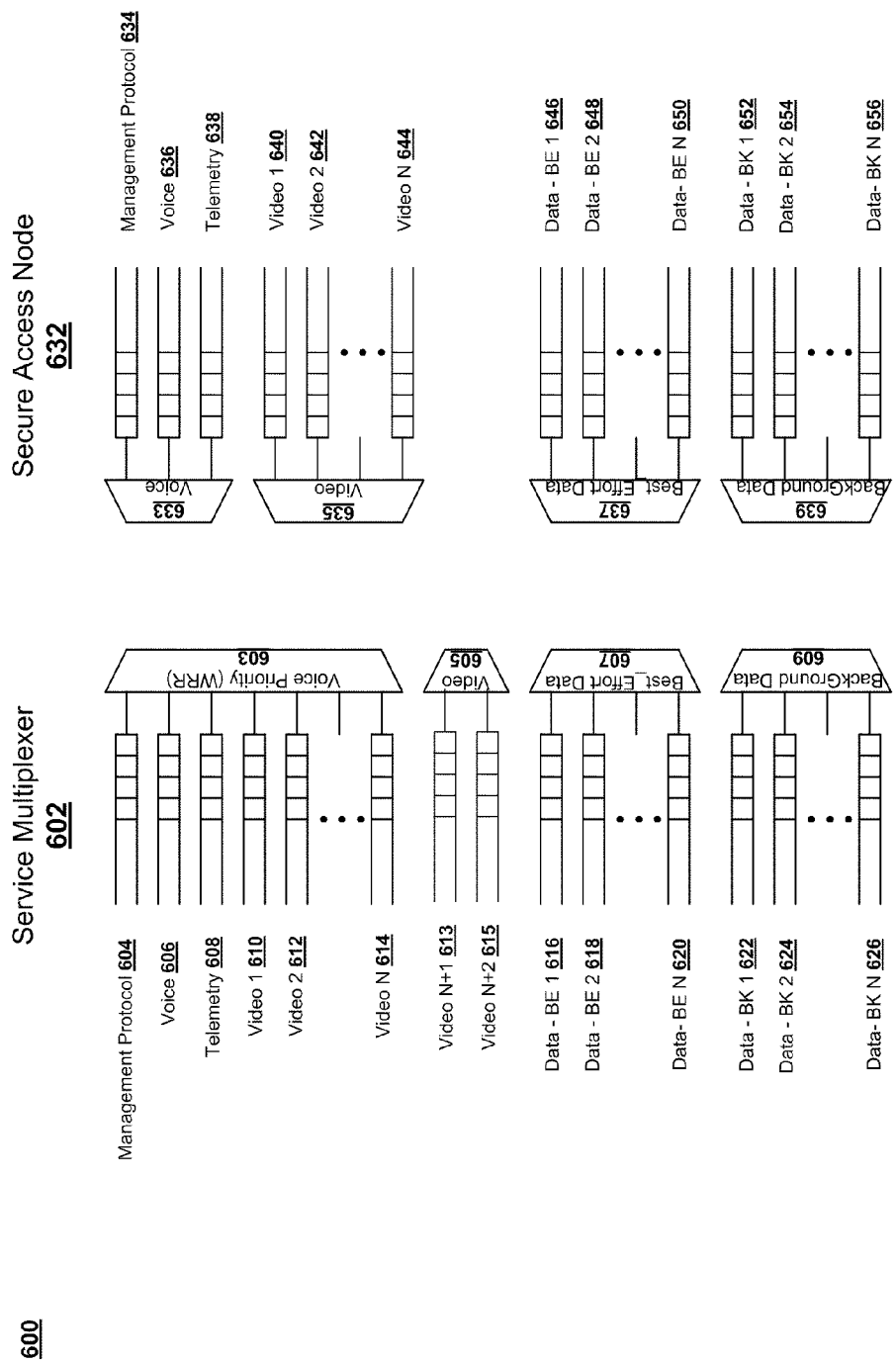
FIG. 6 is an exemplary functional block diagram illustrating another exemplary traffic priority scheme in a wireless communication network.

FIG. 6 is an exemplary functional block diagram illustrating another exemplary traffic priority scheme 600 in a wireless communication network. The traffic priority scheme 600 may be described including two traffic management sub-schemes (602 and 632). Traffic management sub-scheme 602 may be implemented by one communication device such as a service multiplexer and traffic management sub-scheme 632 may be implemented by another communication device such as a secure access node. The traffic management sub-scheme may be similar to the traffic management scheme shown in FIG. 4 in that it comprises of four traffic schedulers (633, 635, 637, 639) that may implements a weighted round robin scheme to transmit buffered packets. Such a traffic management sub-scheme 632 may be implemented within a secure access node transmitting and receiving different types of traffic across the wireless communication network. In the traffic management sub-scheme 632, voice traffic may be designated or determined to be a first priority or the highest priority. A scheduler 633 may be implemented in the secure access node that receives a number of voice traffic streams one of which is shown in FIG. 6 (636). In addition to the voice traffic streams 636, the scheduler 633 may schedule the transmission of management protocol packets 634 from the node management function to manage traffic on other communication devices on the wireless network (e.g. service multiplexer). Also, the scheduler 633 may receive telemetry packets 638. Both management packets 634 and telemetry packets 638 may be designated or configured as first priority and be scheduled using the weighted round-robin (WRR) scheme. Further, video traffic may be designated or determined to be a second priority or the second highest priority. A scheduler 635 may be implemented in the secure access node that receives N number of video traffic streams (640, 642, 644). The video traffic may be one-way streaming video traffic or it may be downstream video traffic that is part of two-way video conferencing. In addition, best effort data traffic may be designated or determined to be a third priority or the third highest priority. A scheduler 637 may be implemented in the secure access node that receives N number of best effort data traffic streams (646, 648. 650). Also, background data traffic may be designated or determined to be a fourth priority or the lowest highest priority. A queue scheduler may be implemented in the secure access node that receives N number of background data traffic streams (652, 654, 656). Persons of ordinary skill in the art would understand that the number of traffic streams for voice, video, best effort data, and background data may be different from one another.

In such a traffic management sub-scheme 632, the secure access node may transmit the voice traffic first, then video traffic, then best effort data traffic and finally background data traffic. Other embodiments may be implemented in weighted round robin scheme as known to those skilled in the art such that a subset of a higher priority (e.g. voice) traffic streams are transmitted before a subset of lower priority (e.g. video) traffic streams to conform to quality of service and network requirements.

Further, a traffic management sub-scheme 602 may be implemented within a service multiplexer transmitting and receiving different types of traffic across the wireless communication network. The service multiplexer may be coupled to a dongle as shown in FIG. 2. In the traffic management sub-scheme 602, voice traffic may be designated or determined to be a first priority or the highest priority. A traffic scheduler 603 may be implemented in the service multiplexer that receives a number of voice traffic streams one of which is shown in FIG. 6 (606). In addition to the voice traffic streams 606, the traffic scheduler 603 may receive management protocol packets 604 from the dongle management function to manage traffic transiting through the service multiplexer. Also, the traffic scheduler 603 may receive telemetry packets 608. Both management packets 604 and telemetry packets 608 may be designate as first priority. In addition, the dongle management function, and may be in conjunction with the node management function implemented by the secure access node, may designate certain types of video traffic such as Video 1 (610), Video 2 (612), and Video N (614) as first priority. The certain types of vide traffic may be upstream video traffic streams that are part of a video conferencing stream.

Further, other types of video traffic such as streaming video may be designated or determined to be a second priority or the second highest priority. A traffic scheduler 605 may be implemented in the service multiplexer that receives Video N+1 (613) and Video N+2 (615) video traffic streams. In addition, best effort data traffic may be designated or determined to be a third priority or the third highest priority. A traffic scheduler 607 may be implemented in the secure access node that receives N number of best effort data traffic streams (616, 618. 620). Also, background data traffic may be designated or determined to be a fourth priority or the lowest highest priority. A traffic scheduler 609 may be implemented in the secure access node that receives N number of background data traffic streams (622, 624, 626). Persons of ordinary skill in the art would understand that the number of traffic streams for voice, video, best effort data, and background data may be different from one another.

The traffic management scheme in FIG. 6 implemented over a wireless communication network (e.g. WiFi) may provide improved quality of service compared to a conventional implementation of the wireless communication network and associated protocols. Such improvements may be made in carry video conferencing traffic between the secure access node and service multiplexer because the upstream video traffic associated with such videoconferencing traffic is designated first priority and delivered at a higher priority with a shorter contention window (resulting in all likelihood shorter backoff times) than conventional traffic management techniques (e.g. designated as second priority). As a result, upstream and downstream video streams have lower probability to collide into each other.

Figure 7:
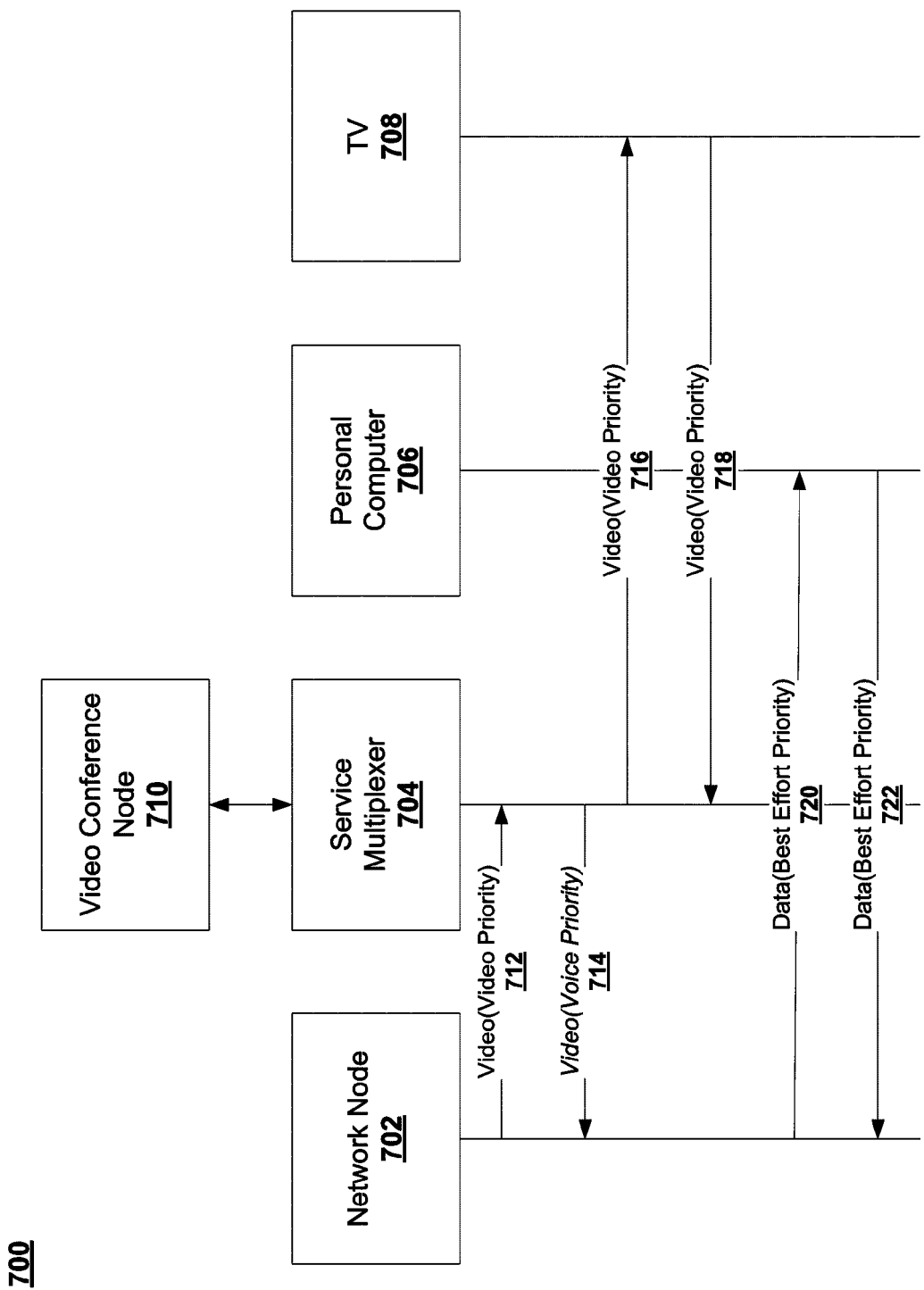
FIG. 7 is an exemplary transaction diagram illustrating an exemplary implementation of a traffic priority scheme in a wireless communication network.

FIG. 7 is an exemplary transaction diagram 700 illustrating an exemplary implementation of a traffic priority (management) scheme in a wireless communication network. A network node (e.g. a secure access node) 702, service multiplexer 704, personal computer 706, and television 708 may be coupled to each other across a wireless communication network. Further, the service multiplexer 704 may be coupled to a video conference node 710 and thereby may receive upstream and downstream video traffic for the video conference node 710. The network node 702 may have a node management function and the service multiplexer may be coupled to a dongle having a dongle management function. The node management function and the dongle management function may implement traffic management and priority schemes as described in the present disclosure.

Further, the network node may transmit video traffic 712 to the service multiplexer 704 (destined for the video conference node 710). Such video traffic 712 may be designated as second priority or video priority based on the traffic management scheme implemented by the node management function. Alternatively, the service multiplexer 704 may transmit video traffic 714 to the network node 702 across the wireless communication network such that the video traffic 714 is designated as first priority or voice priority. Further, the service multiplexer 704 may transmit video traffic 716 to the television 708 at a second priority or video priority. In return, the television 708 may transmit video traffic 718 to the service multiplexer at a second priority or video priority, unlike the upstream video conference traffic 714 which is promoted to voice priority because of real-time nature and large bandwidth constraints of video conference traffic 714. In addition, the network node 702 may transmit best effort data traffic 720 to the personal computer 706 at a third priority or best effort data traffic priority. Alternatively, the personal computer may transmit best effort data traffic 722 also at a third priority or best effort data traffic priority. The traffic management scheme implemented by the service multiplexer 704 by designating vide traffic 714 as first priority traffic reduces the possibility of the video packets of the video traffic stream 714 to collide with other packet streams transmitted downstream including stream 712 across the wireless communication network.

Figure 8:
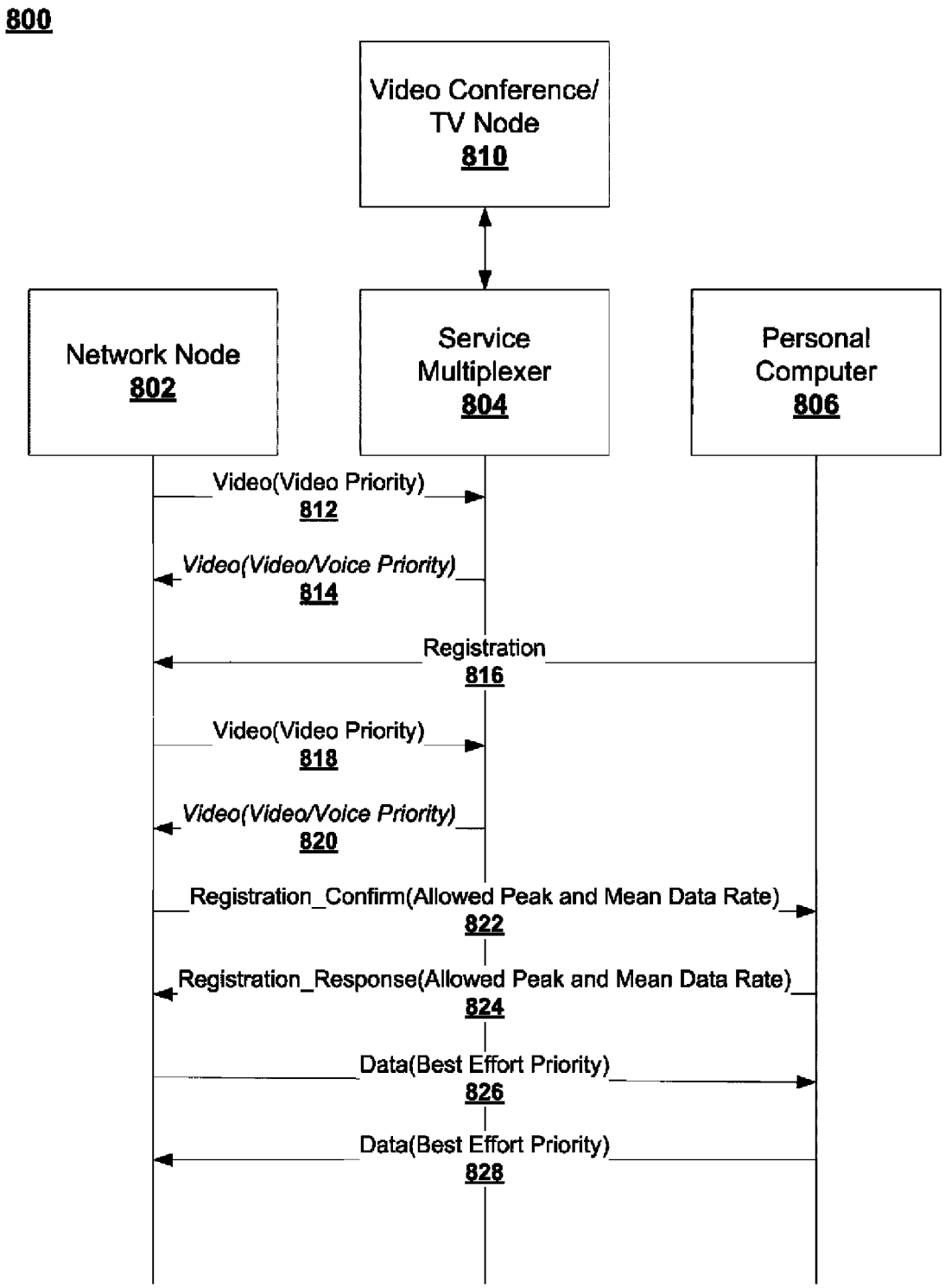
FIGS. 8 and 9 are exemplary transaction diagrams illustrating exemplary traffic management mechanisms for a wireless communication network.

FIGS. 8 is an exemplary transaction diagram 800 illustrating exemplary traffic management mechanisms for a wireless communication network. A network node (e.g. a secure access node) 802, service multiplexer 804, and personal computer 806 may be coupled to each other across the wireless communication network. Further, the service multiplexer 804 may be coupled to a video conference node or a television 810 and thereby may receive upstream and downstream video traffic for the video conferencing. The network node 802 may have a node management function and the service multiplexer 804 may be coupled to a dongle having a dongle management function. The node management function and the dongle management function may implement traffic management and priority schemes as described in the present disclosure.

Further, the network node 802 may transmit video traffic 812 to the service multiplexer 804 (destined for the video conference/TV node 810). Such video traffic 812 may be designated as second priority or video priority based on the traffic management scheme implemented by the node management function. Alternatively, the service multiplexer 804 may transmit video traffic 814 to the network node 802 across the wireless communication network such that the video traffic 814 is designated as first priority (voice priority) or as a second priority (video priority) depending whether the video traffic depending on whether node 810 is a video conference node (first priority) or an alternative node like television (second priority) as well as depending on whether additional traffic management schemes are employed to reduce the possibility for packet collision.

During the transmission of video traffic (812 and 814) to and from the network node 802 and the service multiplexer 804, the personal computer 806 may want to register and be admitted into the wireless communication network. To do so, the personal computer 806 may send a registration request 816 to the network node. The network node 802 may continue to transmit and receive video traffic (818 and 820) from the service multiplexer 804. Further, the network node 802 may transmit a registration confirmation command 822 to the personal computer 806 providing the allowed peak and mean data rate for the personal computer 806 to send best effort data across the wireless confirmation network. The node management function on the network node 802 determines such an allowed peak and mean data rate based on the different types of traffic transiting through the network node 802 to and from the wireless communication network as well as conforming to quality of service and network requirements. In return, the personal computer 806 transmits a registration response packet 824 that confirms the allowed peak and mean data rate. Thereafter, the personal computer 806 may receive and transmit best effort data traffic 826 and 828 across on the wireless communication network at the allowed peak and mean data rates.

Figure 9:
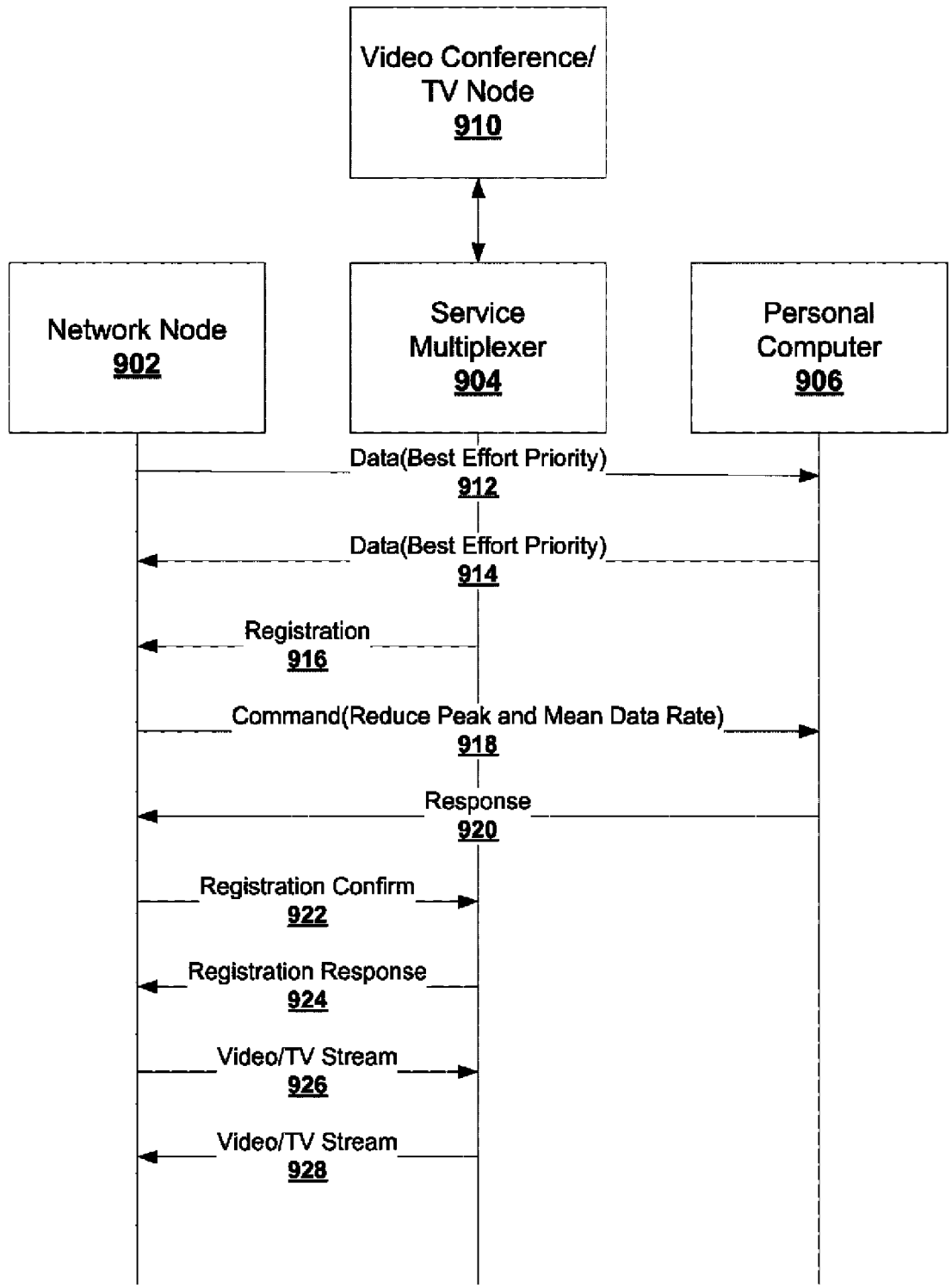

FIG. 9 is an exemplary transaction diagram 900 illustrating exemplary traffic management mechanisms for a wireless communication network. A network node (e.g. a secure access node) 902, service multiplexer 904, and personal computer 906 may be coupled to each other across the wireless communication network. Further, the service multiplexer 904 may be coupled to a video conference node or a television 910 and thereby may receive upstream and downstream video traffic for the video conferencing. The network node 902 may have a node management function and the service multiplexer 904 may be coupled to a dongle having a dongle management function. The node management function and the dongle management function may implement traffic management and priority schemes as described in the present disclosure.

Further, the personal computer 906 may receive and transmit best effort data traffic (912 and 914) across on the wireless communication network at certain peak and mean data rates. Thereafter, the service multiplexer 904 may want register the video conference/TV node 910 into the wireless network, thereby sending a registration request 916 to the network node 902. The node management function on the network node 902 may analyze the different types of traffic transiting the network node to the wireless communication network. Based on the different types of traffic and the traffic management scheme as well as the quality service and network requirements, the network node may send the personal computer 906 a command 918 to reduce the peak and mean data rate of the best effort data received and transmitted from the personal computer 906. In return, the personal computer 906 may provide a response 920 confirming the reduction of the peak and mean data rates for best effort data traffic.

Subsequently, the network node 902 may send the service multiplexer a registration confirmation 922 for admitting video traffic from the video conference/TV node 910 into the wireless network. In return, the service multiplexer 904 may provide a registration response 924 to the network node 902. Thereafter, the network node 902 may transmit and receive video traffic streams (926 and 928) for the video conference/TV node 910 to the service multiplexer 904.

Figure 10:
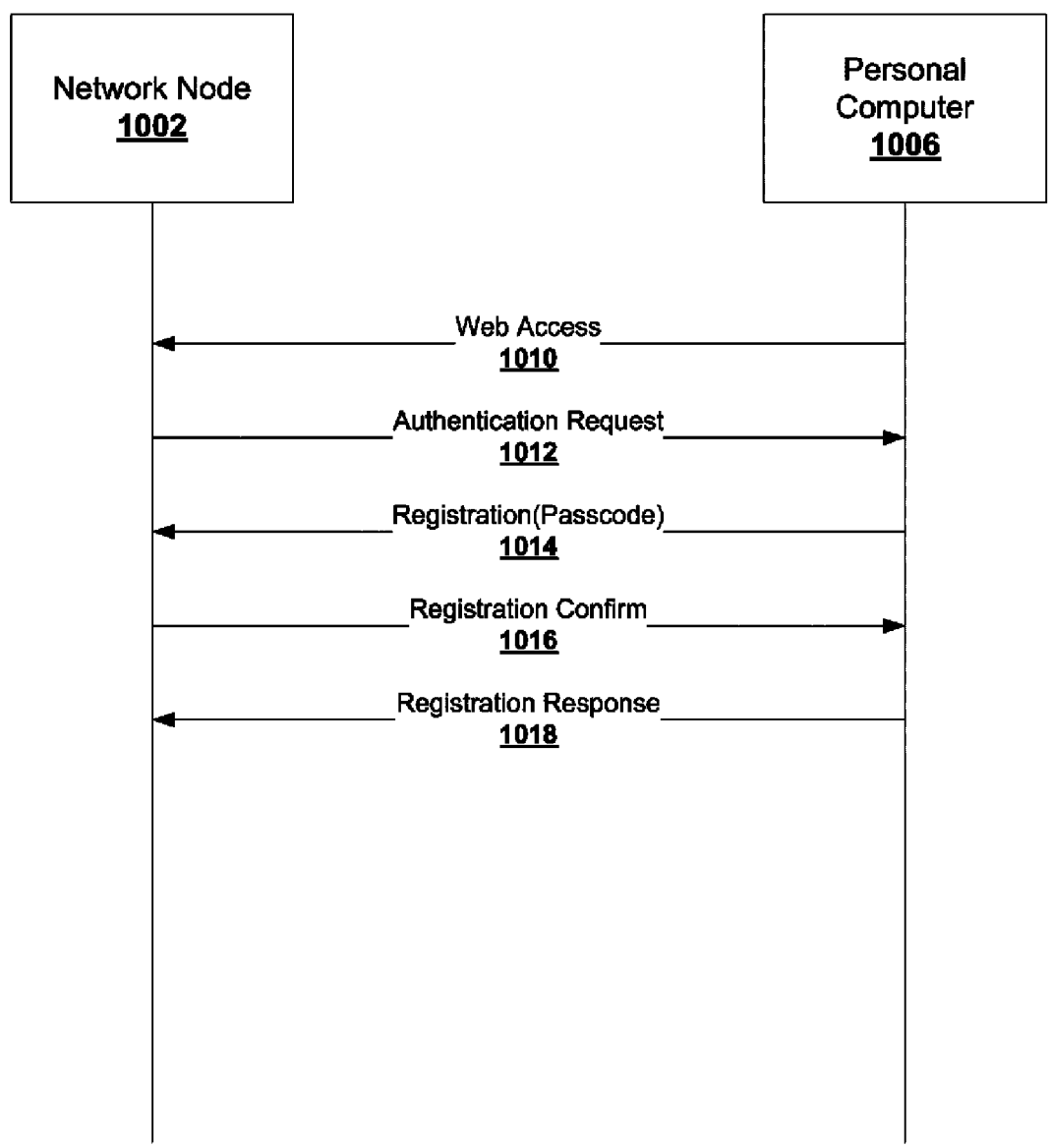
FIG. 10 is an exemplary transaction diagram illustrating an exemplary authentication of an end point device in a wireless communication network.

FIG. 10 is an exemplary transaction diagram 100 illustrating an exemplary authentication of an end point device such as a personal computer 1006 in a wireless communication network. The personal computer may be coupled to a dongle device. Such an authentication process may involve the personal computer 1006 attempting to gain web access 1010 through the wireless communication network and network node 1002. Before allowing the personal computer access to the Web or Internet, the network node 1002 may send the personal computer an authentication request 1012 using a node management function to install software on the personal computer 1006 (e.g. "push install" as known to those of ordinary skill in the art). The installed software would perform all the required dongle management protocol and features. The personal computer 1006 may respond to the authentication request 1012 by accepting the installation of the software and by sending a registration command as well as a passcode 1014. The network node 902 may send a registration confirmation 1016 to the personal computer 1006. In return, the personal computer may provide a registration response 1018 to the network node 1002 to complete the registration process.

Figure 11:
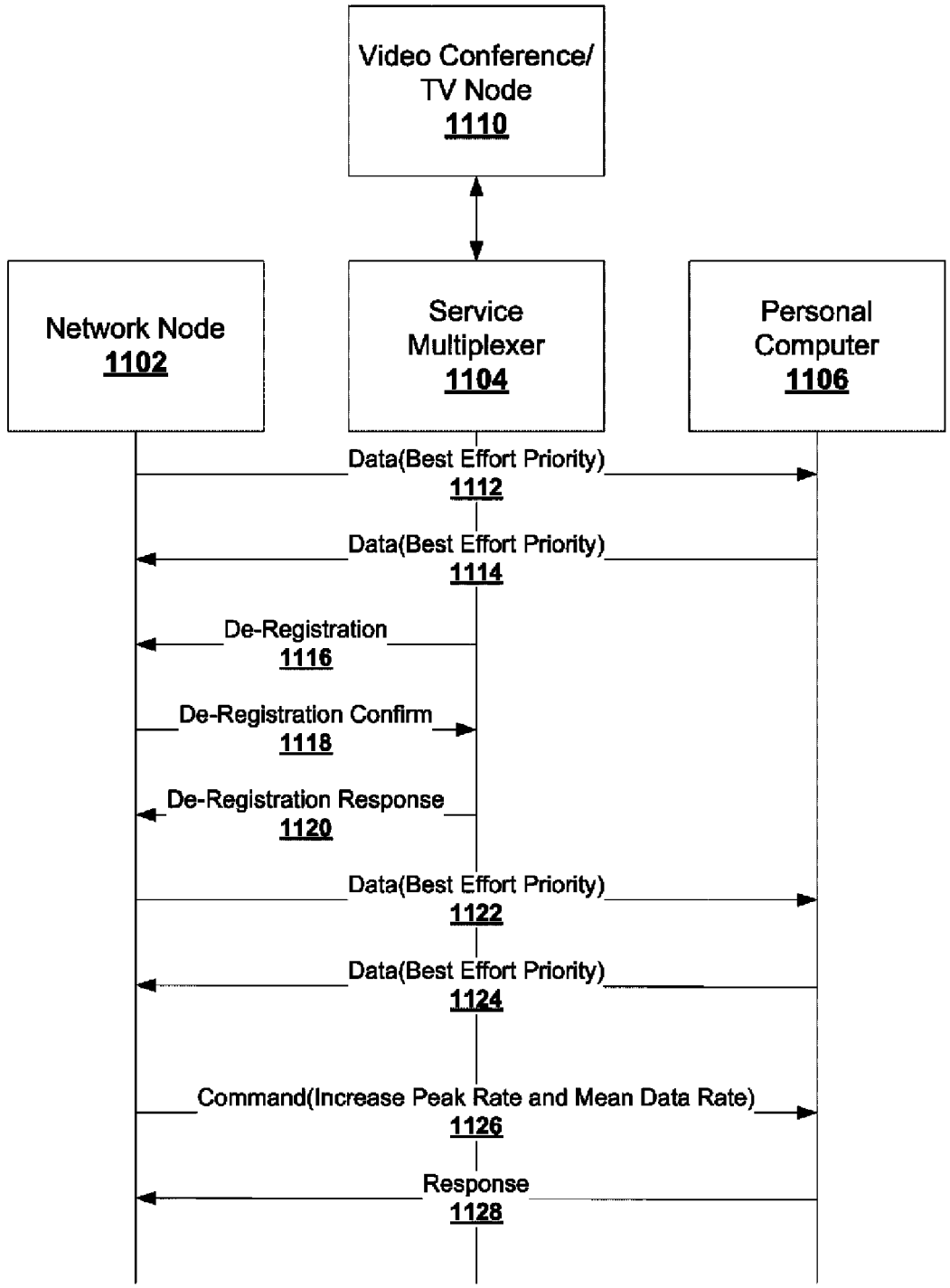
FIG. 11 is an exemplary transaction diagram illustrating an exemplary traffic management mechanism for a wireless communication network.

FIG. 11 is an exemplary transaction diagram 1100 illustrating an exemplary traffic management mechanism for a wireless communication network. A network node (e.g. a secure access node) 1102, service multiplexer 1104, and personal computer 1106 may be coupled to each other across the wireless communication network. Further, the service multiplexer 1104 may be coupled to a video conference node or a television 1110 and thereby may receive upstream and downstream video traffic for the video conferencing. The network node 1102 may have a node management function and the service multiplexer 1104 may be coupled to a dongle having a dongle management function. The node management function and the dongle management function may implement traffic management and priority schemes as described in the present disclosure.

Further, the personal computer 1106 may receive and transmit best effort data traffic (1112 and 1114) across on the wireless communication network at certain peak and mean data rates. Thereafter, the service multiplexer 1104 may want to de-register the video conference/TV node 1110 from the wireless network, thereby sending a de-registration request 1116 to the network node 1102. Subsequently, the network node 1102 may send the service multiplexer 1104 a de-registration confirmation 1118. In return, the service multiplexer 1104 may provide a de-registration response 1120 to the network node 1102. Further, the personal computer 1106 may continue to receive and transmit best effort data traffic (1122 and 1124) across on the wireless communication network.

In addition, the node management function on the network node 1102 may analyze the different types of traffic transiting the network node to the wireless communication network. Based on the different types of traffic and the traffic management scheme as well as the quality service and network requirements, the network node may send the personal computer 1106 a command 1126 to increase the peak and mean data rate of the best effort data received and transmitted from the personal computer 1106. In return, the personal computer 1106 may provide a response 1128 confirming the increase of the peak and mean data rates for best effort data traffic.

In an embodiment associating a dongle with a video terminal node (video dongle), and such a vide dongle becomes inactive without properly de-registering, a node management function may periodically send a command packet to query status of a video dongle to identify a level of activeness. If a video dongle is no longer active according to such a query/discovery process, the video dongle may be forced to shut down and the bandwidth associated with the video dongle application may be re-allocated to other applications.

Figure 12:
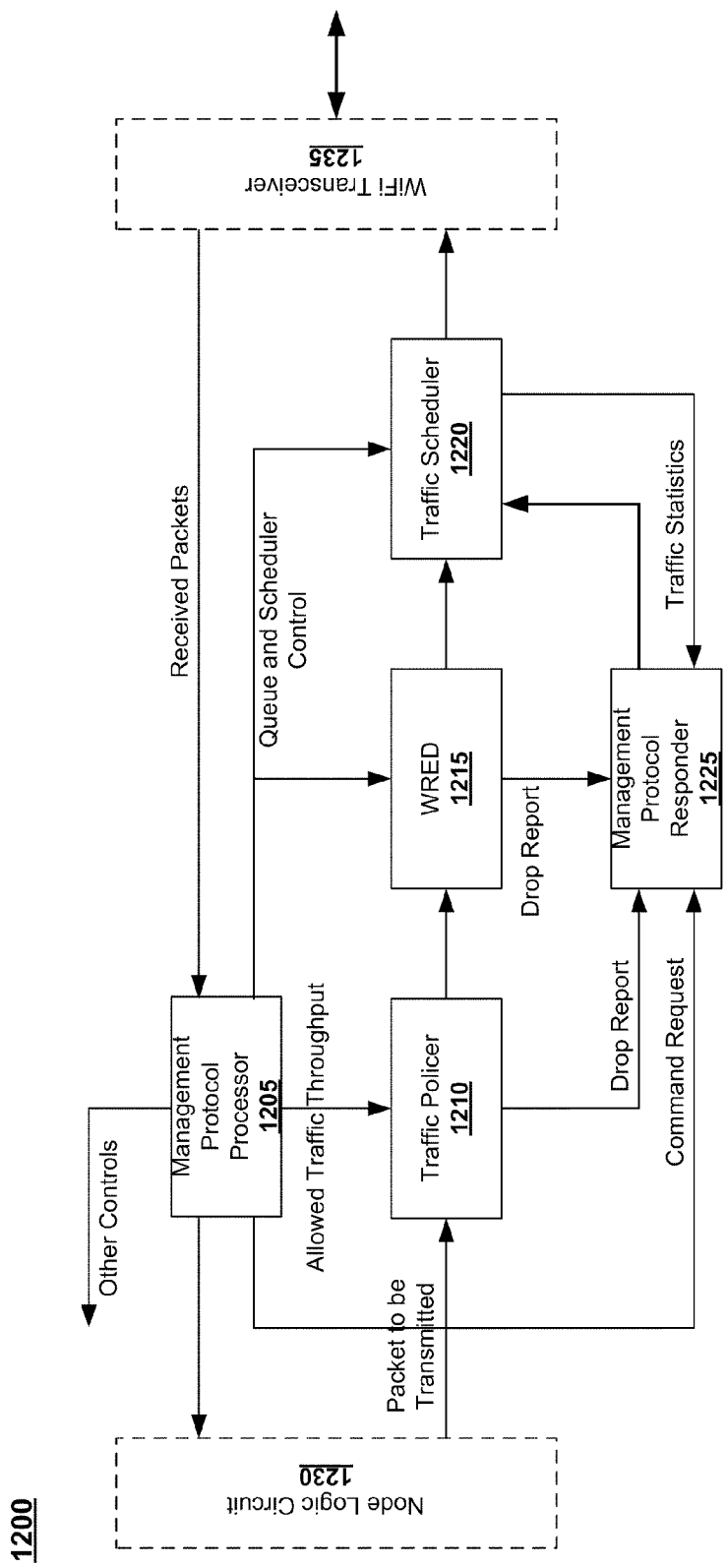
FIG. 12 is an exemplary functional diagram depicting a device traffic manager implementing an exemplary traffic management scheme.

FIG. 12 is an exemplary functional diagram depicting a device traffic manager 1200 implementing an exemplary traffic management scheme. A node management function on a network node or a dongle management function coupled to another communication device may include the device traffic manager 1200. One of the function of the device traffic manager 1200 may be traffic scheduling. Further, the device traffic manager 1200 may have several different components that include management protocol processor 1205, a traffic policer 1210, a weighted random round robin early discard engine 1215, a traffic scheduler 1220, and a management protocol responder 1225. The weighted random round robin early discard engine 1215 and a traffic scheduler 1220 may be called collectively a discard and scheduler engine. Additional components of the device traffic manager 1200 may include a node logic circuit and a WiFi transceiver 1235. In addition, persons of ordinary skill in the art would understand data and commands exchanged between the different functional components (1205-1235) shown in FIG. 12 (e.g. drop report, command request, queue and scheduler control, etc.).

The management protocol processor 1205 receives one or more data packets from the WiFi transceiver 1235, traps one or more management protocol packets, processes the one or more management protocol packets, and transmits instructions to reallocate wireless communication network bandwidth based on processing the one or more management protocol packets. Further, the management protocol processor 1205 verifies a quality-of-service for one or more transmission packets. The traffic policer 1210 verifies one or more traffic streams received from node logic circuit 1230 (from the node logic circuit from either network node or the dongle) to conform to the respective service level agreement and perform traffic shaping on the one or more traffic streams using a queue. In addition, the discard and scheduler engine (1215 and 1220) performs weighted random early discard based on queue depth and weighted round robin scheduling. Weighted round robin scheduling may be performed for each class of traffic. Additional intelligence could be applied to the WRED dropping mechanism so that packets may be dropped such that they would not cause severe retransmit of a session or cause any other unnecessary delays. Also, the management protocol responder 1225 generates one or more control packets for management protocol function according to the Management Protocol Processor's instruction to respond to a master controller's request including commands like a status query with a command response from the master controller function if it is located in a dongle. The management protocol responder 1225 may also generate response protocol packets and other protocol packets facilitating registration and de-registration processes according to the Management Protocol Processor's requests. If the management protocol responder 1225 is located in a Network Node, it would send out management protocol packet according to the Management Protocol Processor's requests including command and registration confirmation packets.

FIG. 13 shows exemplary traffic diagrams (1300 and 1341) illustrating an exemplary time division traffic management scheme to be implemented on traffic carried by a wireless communication network such as WiFi. A traffic diagram 1300 illustrates a time division management scheme, as a result, there may be a possibility of packet collision being reduced. The node management function and/or the dongle manage function may implement the time division scheme to satisfy quality of service requirements and network requirements. The time division management traffic management scheme transmits video traffic in a time division manner and the other types of traffic (e.g. best effort data, background data) are contending for the remaining time in a time period using CSMA/CA techniques. In the exemplary traffic diagram 1300, two time periods are shown. The wireless communication network may carry four video traffic streams. Therefore, a time division multiplexing scheme is implemented with four time slots, t1 (1302 and 1322), t2 (1304 and 1324), t3 (1306 and 1326), and t4 (1308 and 1328) in a given time period A video traffic stream is transmitted during each time slot 1341 (1302-1328). The remaining time in the time period 1343 is for other types of traffic (voice, best effort data, and background data). The traffic diagram 1341 shows that one of the four video traffic streams shown in traffic diagram 1300 has been terminated or no longer active. Consequently, the traffic management scheme allocates the time slot that was previously allocated to the terminate video traffic to the other types of traffic (voice, best effort data, background data). Thus, remaining three video traffic streams are transmitted during time slots t1 (1342), t2 (1344), and t3 (1346), respectively 1381. Other types of traffic (voice, best effort data, and background data) are transmitted during the remaining time 1383 in the time period. This includes time slot t4 (1348) that was previously allocated to the terminated or inactive video traffic stream.

Further embodiments of the time division multiplexing scheme may be configured such that voice traffic streams can be transmitted in the time period (1343, 1383) with the data traffic streams or transmitted in one of the time slots assigned to one of the video traffic streams (1302-1308, 1342-1346) whenever possible (likelihood of collision may be small between voice stream and video stream) because voice traffic has higher priority than video and data. The time division multiplexing scheme shown in FIG. 13 may implemented by the management protocol processor 1205 by turning on and off the traffic scheduler 1220. The management protocol processors are synchronized to each other among the network node and the dongles by using Network Timing Protocol (NTP). One vehicle to implement the distribution of the NTP information using the management protocol is to institute a synchronization command which contains required NTP timing information. As a result, timing to identify the time slot can be synchronized among the network node and dongles.

Figure 14:
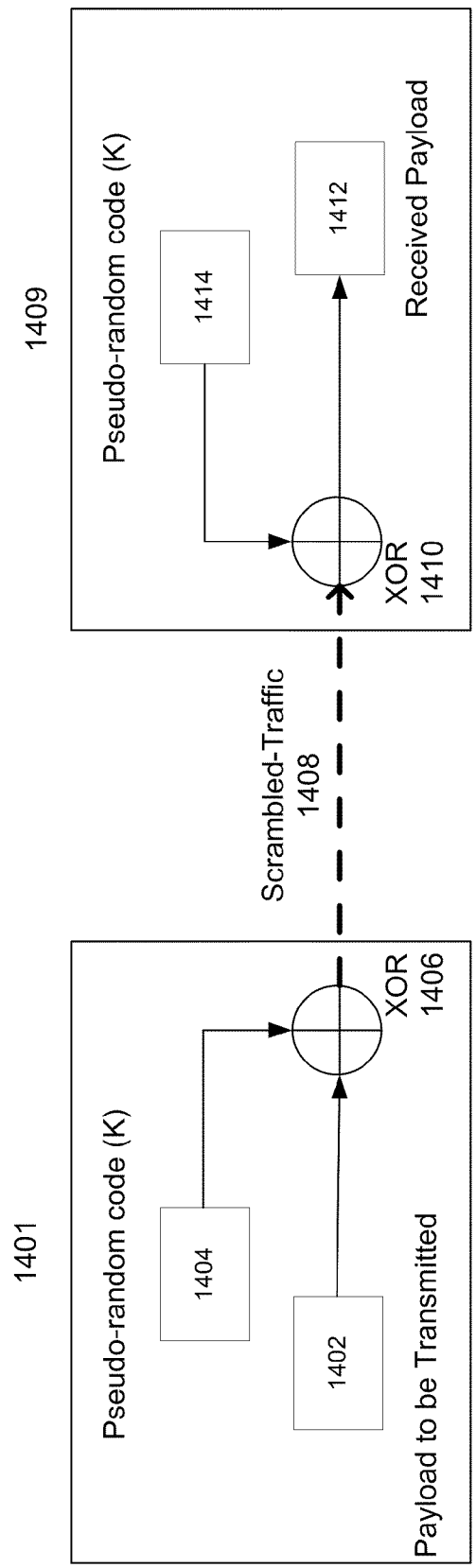
FIG. 14 is an exemplary functional block diagram illustrating encryption of a information traffic scheme.

WiFi security schemes using such security protocols as WPAv½ or WEP are considered the weak point for WiFi security concerns. FIG. 14 is an exemplary functional block diagram 1400 illustrating encryption of a information traffic scheme. The transmission side of the encryption scheme 1401 includes the payload to be transmitted 1402 and the pseudo-random code 1404. The payload of the traffic scheme may be encrypted by inputting the payload 1402 and the pseudo-random code 1404 in to an exclusive-or function. The output of the exclusive-or function 1406 is the encrypted or scrambled traffic 1408. This scrambled traffic 1408 can be transported via a WiFi Network including the one with traffic management schemes described in the present disclosure. Alternatively, the reception side of the encryption scheme 1400 includes an exclusive-or function 1410 and a pseudo-random code 1414. The pseudo-random code 1404 and 1414 shall be synchronized. One method to synchronize application of 1404 and 1414 is to use the packet header information to identify the start and ending point for applying the codes 1404 and 1414. The output of the exclusive-or function is the received payload 1412. As a results, the security and privacy of the WiFi traffic schemes is further enhanced. Unlike WAP, WEP or other security protocols, only a key for the pseudo-random code is provided to both network node and dongle performing the encryption shown in FIG. 14. The encryption embodiment shown in FIG. 14 may encrypt only the payload or only the header of a traffic stream or both a header and the payload.

Figure 15A:
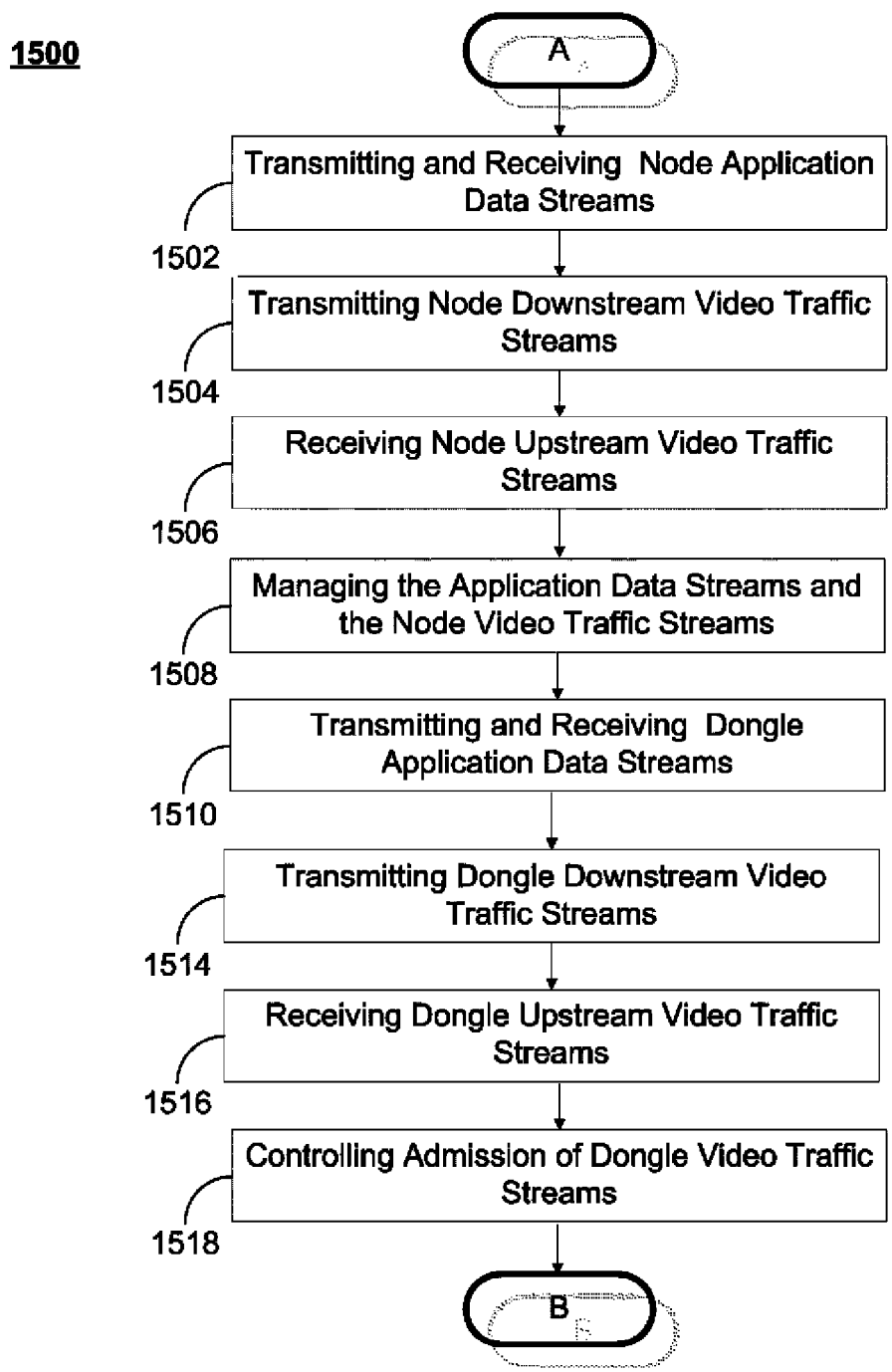
FIGS. 15A-15C are exemplary flowcharts illustrating exemplary methods for managing different types of traffic across a wireless communication network.
Figure 15B:
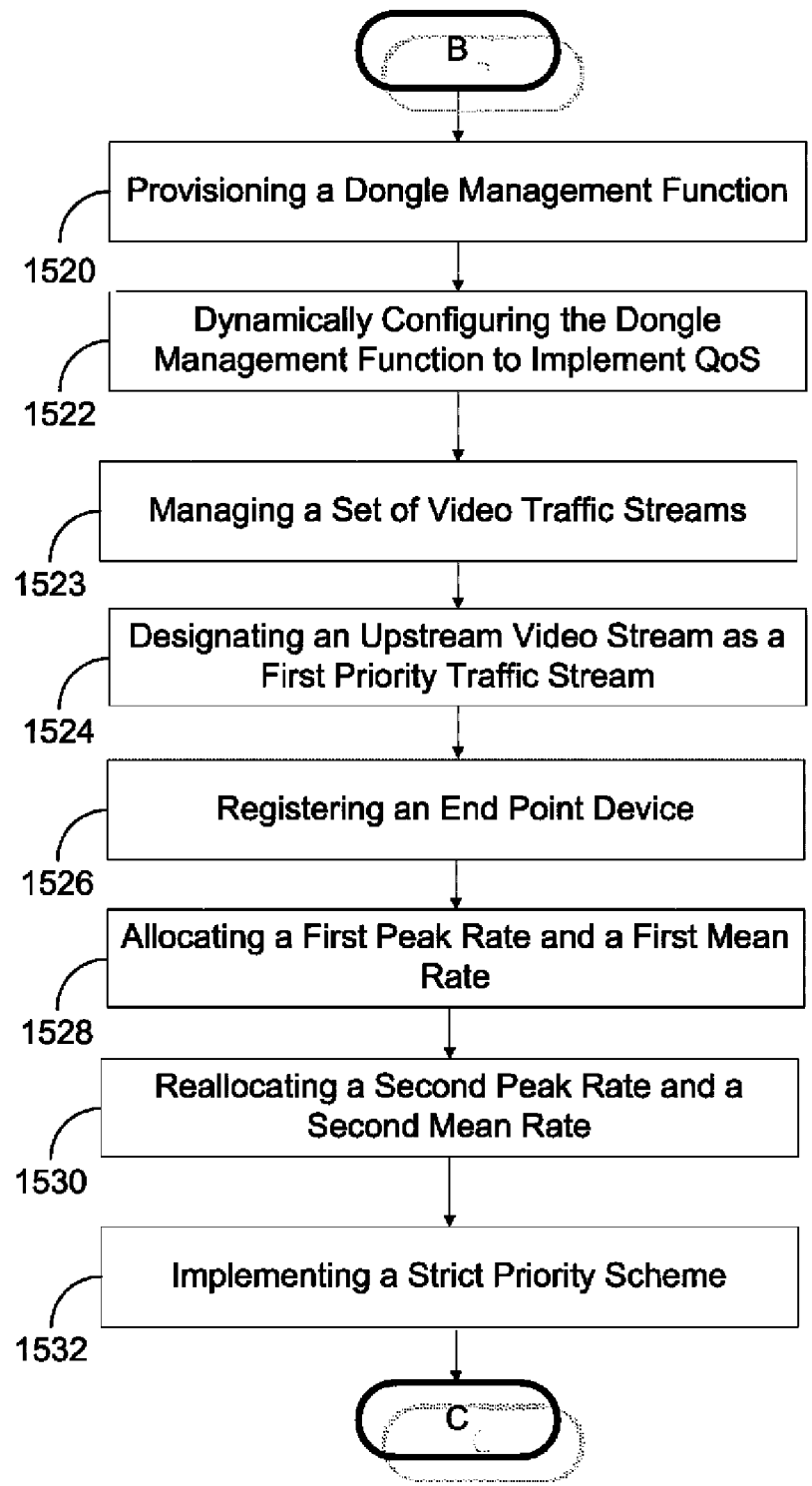
Figure 15C:
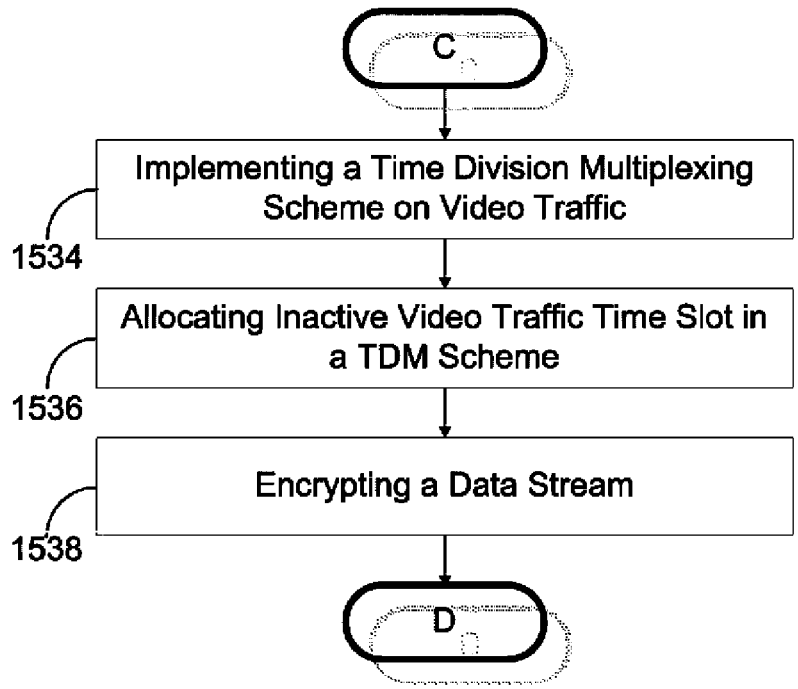

FIGS. 15A-15C are exemplary flowcharts illustrating exemplary methods for managing different types of traffic across a wireless communication network. In FIG. 15A, a step in the exemplary method 1500 may be transmitting and receiving one or more application data streams including a node video application, as shown in block 1502. The node video application includes a conversion engine. An additional step in the method may be the node video application transmitting one or more downstream video streams, as shown in block 1504. A further step in the method may be receiving one or more upstream video streams, as shown in block 1506. Another step in the method may be managing one or more node video traffic stream and the one or more application data streams using a master controller function and a node management function, as shown in block 1508. An additional step may be transmitting and receiving one or more application data streams using a dongle management function, as shown in block 1510. The application data streams may include a dongle video application wherein the dongle video application including a conversion engine. A further step may be the dongle video application transmitting one or more upstream video streams, as shown in block 1514. Another method may be receiving one or more downstream video streams from the wireless communication network, as shown in block 1516. A further step may be controlling admission of a dongle video traffic stream to the wireless communication network using a dongle management function, as shown in block 1518.

Referring to FIG. 15B, another step in the example method may be provisioning a dongle management function application to the wireless dongle across the wireless communication network using the master controller and node management function, as shown in block 1520. A further step may be dynamically configuring the dongle management function to implement quality-of-service requirements received by the master controller function by the dongle management function, as shown in block 1522. An additional step method may be managing a set of video traffic streams that includes a first subset of video traffic streams and a second subset of video traffic streams using the node management function, as shown in block 1523. Another step may be designating or configuring a first subset (upstream) of video traffic streams as first priority based on analyzing the one or more types of traffic received and sent from the network node, as shown in block 1524. A further step may be registering a first end point device of the one or more end point devices into the wireless communication network, as shown in block 1526. An additional step may be allocating a first peak data rate and a first mean data rate to the first end point device for transmission of data based on one or more types of traffic flowing across the wireless communication network and one or more wireless communication network requirements, as shown in block 1528. Another method may be reallocating a second peak data rate and a second mean data rate to the first end point device for transmission of data based on a change in characteristics of the one or more types of traffic flowing across the wireless communication and a change in one or more wireless communication network requirements, as shown in block 1530. A further step may be implementing strict priority scheme to manage one or more dongle application traffic streams and the dongle video traffic stream, as shown in block 1532.

Referring to FIG. 15C, another step in the method may be implementing a time division multiplexing scheme on the video traffic bandwidth using the node management function and the dongle management function such that each of the one or more video traffic streams are assigned a time slot in the time division multiplexing scheme, as shown in block 1534. An additional step may be reallocating a time slot for an inactive video stream to one or more application data streams, as shown in block 1536. A further step may be performing a security function using a pseudo-random code to encrypt a secured traffic stream between the network node and the wireless dongle over the wireless communication network using the node management function and the dongle management function, as shown in block 1538. A key associated with the pseudo-random code is dynamically configured.

The traffic management schemes described in the present disclosure may be implemented, for example, in a wireless communication network environment and may be generally implemented in a multiple transmitter and multiple receiver communication environment such that the multiple transmitters and multiple receivers share a communication medium.

Persons of ordinary skill in the art would understand that the examples described in the present disclosure are illustrative and not limiting and that the concepts illustrated in the examples may be applied to other examples and embodiments.

Note that the functional blocks, methods, devices and systems described in the present disclosure may be integrated or divided into different combination of systems, devices, and functional blocks as would be known to those skilled in the art.

In general, it should be understood that the circuits or functions described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for managing one or more types of traffic over a wireless communication network, the system comprising:
   (a) one or more content devices;
   (b) a first wireless terminal and a second wireless terminal each coupled to the wireless communication network;
   (c) a first end point device of one or more end point devices having an end point communication interface;
   (d) a network node having:
      (i) one or more node communication interfaces wherein the network node is coupled to the one or more content devices, and the first wireless terminal through the one or more node communication interfaces;
      (ii) one or more node application functions transmitting and receiving one or more application data streams including a node video application;
      (iii) wherein the node video application includes a conversion engine, the node video application transmitting one or more downstream video streams and receiving one or more upstream video streams;
(iv) a master controller function and a node management function each managing one or more node video traffic streams and the one or more application data streams, transmitting the one or more downstream video streams and the one or more application data streams and receiving one or more upstream video streams and the one or more application data streams across the wireless communication network;
(v) a common operating system performing resource management and coupled to the one or more node communication interfaces, one or more application functions, the node video application, the master controller function and the node management function;
(e) a wireless dongle having:
(i) one or more dongle communication interfaces wherein the wireless dongle is coupled to the second wireless terminal and the first end point device through the one or more dongle communication interfaces;
(ii) one or more dongle application functions transmitting and receiving one or more application data streams including a dongle video application;
(iii) wherein the dongle video application including a conversion engine the dongle video application transmitting one or more upstream video streams to and receiving one or more downstream video streams from the wireless communication network;
(iv) a dongle management function managing one or more application data streams and controlling admission of a dongle video traffic stream originating from the wireless dongle to the wireless communication network wherein the dongle management function manages a set of video traffic streams that includes one or more upstream video traffic streams and one or more downstream video traffic streams, and the dongle management function configures one or more upstream video traffic streams as a first priority based on one or more management commands received from the node management function in the network node;
(v) a dongle common operating system performing resource management and coupled to the one or more dongle communication interfaces, the dongle video application and the dongle management function.

2. The system of claim 1, wherein the node management function and dongle management function are selected from the group consisting of priority, policing, traffic shaping, scheduling, admission control, authentication functions and dynamic administration of one or more service level agreements.

3. The system of claim 2, wherein the dongle management function is dynamically configured to implement quality-of-service requirements received from the master controller function.

4. The system of claim 2, wherein the master controller and node management function provision a dongle management function application in the wireless dongle through the wireless communication network.

5. The system of claim 1, wherein the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

6. The system of claim 5, wherein the node management function registers the first end point device of the one or more end point devices into the wireless communication network and allocates a first peak data rate and a first mean data rate to the first end point device for transmission of data from the first end point device based on one or more types of traffic flowing across the wireless communication network and one or more wireless communication network requirements.

7. The system of claim 6, wherein the node management function reallocates a second peak data rate and a second mean data rate to the first end point device for transmission of data from the first end point device based on a change in characteristics of the one or more types of traffic flowing across the wireless communication network and a change in one or more wireless communication network requirements.

8. The system of claim 5, wherein the dongle management function implements a strict priority scheme to manage the one or more application data streams.

9. The system of claim 5, wherein:
(a) the network node controls allocation of application data streams to the available wireless communication network bandwidth based on traffic type and characteristics of the application data streams using the master controller function and the node management function,
(b) the node management function allocates a video traffic bandwidth that is a subset of the wireless communication network bandwidth for one or more video traffic streams,
(c) the node management function and the dongle management function implements a time division multiplexing scheme on the video traffic bandwidth such that each of the one or more video traffic streams are assigned a time slot in the time division multiplexing scheme for transmission across the wireless communication network.

10. The system of claim 9, wherein a time slot allocated to an inactive video traffic stream is reallocated to one or more active application data streams.

11. The system of claim 1, further comprising a first terminal device traffic manager coupled to the network node and a second terminal device traffic manager coupled to the wireless dongle, each terminal device traffic manager performing traffic scheduling and having:
(a) a management protocol processor that receives one or more data packets, traps one or more management protocol packets, processes the one or more management protocol packets, and transmits instructions to the wireless dongle to reallocate wireless communication network bandwidth based on processing the one or more management protocol packets, and verifies a quality-of-service for one or more transmission packets;
(b) a traffic policer verifying one or more traffic streams conforming to a respective service level agreement and performing traffic shaping on the one or more traffic streams using a queue;
(c) a scheduler engine that provides weighted round robin scheduling on scheduled traffic stream wherein weighted random early discard is performed based on excessive queue depth;
(d) a management protocol responder generating one or more control packets for a management function and responding to one or more trapped management protocol packets.

12. The system of claim 1, wherein the node management function and the dongle management function perform a security function using a pseudo-random code to encrypt an secured traffic stream between the network node and the wireless dongle over the wireless communication network wherein a key associated with the pseudo-random code is dynamically configured.

13. The system of claim 1, wherein the one or more end point devices are selected from the group consisting of a personal computer, smartphone, electronic reader, television, video camera, and a wireless enabled appliance.

14. The system of claim 1, wherein the one or more application data streams is selected from the group consisting of voice traffic, video traffic, best effort data traffic, and background data traffic.

15. The system of claim 1, wherein the one or more content devices may include a cable modem, a DSL modem, a WiMax access device, a Passive Optical Networking access device, an Optical Networking Terminal, an Optical Networking Unit, a Long Term Evolution wireless access device, a satellite access device, a broadband access device, a set-top box, a DVR, a DVD player, a BluRay player, and an antenna tuner.

16. A method for managing one or more types of traffic over a wireless communication network, the method comprising:
(a) transmitting and receiving one or more application data streams including a node video application wherein the node video application includes a conversion engine, the node video application in a network node transmitting one or more downstream video streams and receiving one or more upstream video streams;
(b) managing one or more node video traffic streams and the one or more application data streams using a master controller function and a node management function in the network node, transmitting the one or more downstream video streams and the one or more application data streams and receiving one or more upstream video across the wireless communication network;
(c) transmitting and receiving one or more application data streams using a dongle management function including a dongle video application wherein the dongle video application includes a conversion engine, the dongle video application transmitting one or more upstream video stream to and receiving one or more downstream video streams from the wireless communication network;
(d) managing one or more application data streams and controlling admission of a dongle video traffic stream originating from a wireless dongle to the wireless communication network using the dongle management function;
(e) managing a set of video traffic streams that includes one or more upstream video traffic streams and one or more downstream video traffic streams using the dongle management function; and
(f) configuring one or more video traffic streams as first priority based on one or more management commands received from the node management function in the network node.

17. The method of claim 16, wherein the node management function and dongle management function are selected from the group consisting of priority, policing, traffic shaping, scheduling, admission control, authentication functions and dynamic administration of one or more service level agreements.

18. The method of claim 17, the method further comprising dynamically configuring the dongle management function to implement quality-of-service requirements received from the master controller function.

19. The method of claim 16, the method further comprising provisioning a dongle management function application in a wireless dongle through the wireless communication network using the master controller and node management function.

20. The method of claim 16, wherein the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

21. The method of claim 20, the method further comprising:
(a) registering a first end point device of one or more end point devices into the wireless communication network; and
(b) allocating a first peak data rate and a first mean data rate to the first end point device for transmission of data based on one or more types of traffic flowing across the wireless communication network and one or more wireless communication network requirements.

22. The method of claim 21, the method further comprising reallocating a second peak data rate and a second mean data rate to the first end point device for transmission of data based on a change in characteristics of the one or more types of traffic flowing across the wireless communication network and a change in one or more wireless communication network requirements.

23. The method of claim 20, the method further comprising implementing strict priority scheme to manage one or more application data streams by the dongle management function.

24. The method of claim 20, the method further comprising:
(a) controlling allocation of application data streams to the available wireless communication network bandwidth based on traffic type and characteristics of the application data streams using the master controller function and the node management function;
(b) allocating a video traffic bandwidth that is a subset of the wireless communication network bandwidth for one or more video traffic streams using the node management function;
(c) implementing a time division multiplexing scheme on the video traffic bandwidth using the node management function and the dongle management function such that each of the one or more video traffic streams are assigned a time slot in the time division multiplexing scheme.

25. The method of claim 24, the method further comprising allocating a time slot for an inactive video traffic stream to one or more active application data streams.

26. The method of claim 16, wherein a first terminal device traffic manager coupled to the network node and a second terminal device traffic manager coupled to the wireless dongle, each terminal device traffic manager performing traffic scheduling and having:
(a) a management protocol processor that receives one or more data packets, traps one or more management protocol packets, processes the one or more management protocol packets, and transmits instructions to the wireless dongle to reallocate wireless communication network bandwidth based on processing the one or more management protocol packets, and verifies a quality-of-service for one or more transmission packets;
(b) a traffic policer verifying one or more traffic streams conforming to a respective service level agreement and performing traffic shaping on the one or more traffic streams using a queue;

(c) a scheduler engine that provides weighted round robin scheduling on scheduled traffic stream wherein weighted random early discard is performed based on excessive queue depth;

(d) a management protocol responder generating one or more control packets for management function and responding to one or more trapped management protocol packets.

27. The method of claim 16, the method comprising performing a security function using a pseudo-random code to encrypt a secured traffic stream between the network node and the wireless dongle over the wireless communication network using the node management function and the dongle management function wherein a key associated with the pseudo-random code is dynamically configured.

28. The method of claim 16, wherein the one or more end point devices are selected from the group consisting of a personal computer, smartphone, electronic reader, television, video camera and a wireless enabled appliance.

29. The method of claim 16, wherein the one or more application data streams is selected from the group consisting of voice traffic, video traffic, best effort data traffic, and background data traffic.

30. A device for managing one or more types of traffic over a wireless communication network, the device comprising:

(a) one or more node communication interfaces;

(b) one or more application functions transmitting one or more application data streams including a node video application;

(c) wherein the node video application includes a conversion engine, the node video application transmitting one or more downstream video streams and receiving one or more upstream video streams;

(d) a master controller function and a node management function each managing one or more node video traffic streams and the one or more application data streams, transmitting the one or more downstream video streams and the one or more application data streams and receiving one or more upstream video streams and the one or more application data streams across the one or more node communication interfaces;

(e) a common operating system performing resource management and coupled to the one or more node communication interfaces, one or more application functions, the node video application, the master controller function and the node management function; and (f) a terminal device traffic manager coupled to the network node, the terminal device traffic manager performing traffic scheduling and having:

a management protocol processor that receives one or more data packets, traps one or more management protocol packets, processes the one or more management protocol packets, and transmits instructions to a wireless dongle to reallocate wireless communication network bandwidth based on processing the one or more management protocol packets, and verifies a quality-of-service for one or more transmission packets;

a traffic policer verifying one or more traffic streams conforming to a respective service level agreement and performing traffic shaping on the one or more traffic streams using a queue;

a scheduler engine that provides weighted round robin scheduling on scheduled traffic stream wherein weighted random early discard is performed based on excessive queue depth; and a management protocol responder generating one or more control packets for a management function and responding to one or more trapped management protocol packets.

31. The device of claim 30, wherein the node management function is selected from the group consisting of priority, policing, traffic shaping, scheduling, admission control, authentication functions and dynamic administration of one or more service level agreements.

32. The device of claim 30, wherein the master controller and the node management function transmit provisioning commands for a dongle management function application to the one or more node communication interfaces.

33. The device of claim 30, wherein the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

34. The device of claim 33, wherein the node management function transmits registration information for a first end point device of the one or more end point devices to the one or more node communication interfaces and transmits allocation information to the node communication interface, the allocation information including a first peak data rate and a first mean data rate for the first end point device for transmission of data based on one or more types of traffic flowing across the wireless communication network and one or more wireless communication network requirements.

35. The device of claim 34, the node management function transmits reallocation information including a second peak data rate and a second mean data rate to the one or more node communication interfaces for the first end point device for transmission of data from the first end point device based on a change in characteristics of the one or more types of traffic flowing across the wireless communication network and a change in one or more wireless communication network requirements.

36. The device of claim 33, wherein:

(a) the network node controls allocation of application data streams to available wireless communication network bandwidth on traffic type and characteristics of the application data streams using the master controller function and the node management function, (b) the node management function allocates a video traffic bandwidth that is a subset of the wireless communication network bandwidth for one or more video traffic streams, (c) the node management function implements a time division multiplexing scheme on the video traffic bandwidth such that each of the one or more video traffic streams are assigned a time slot in the time division multiplexing scheme for transmission across the wireless communication network.

37. The device of claim 36, wherein a time slot allocated to an inactive video traffic stream is reallocated to one or more active application data streams.

38. The device of claim 30, wherein the node management function performs a security function using a pseudo-random code to encrypt an secured traffic stream wherein a key associated with the pseudo-random code is dynamically configured.

39. The device of claim 30, wherein the one or more end point devices are selected from the group consisting of a personal computer, smartphone, electronic reader, television, video camera, and a wireless enabled appliance.

40. The device of claim 30, wherein the one or more application data streams is selected from the group consisting of voice traffic, video traffic, best effort data traffic, and background data traffic.

41. The device for managing one or more types of traffic over a wireless communication network, the device comprising:
(a) one or more dongle communication interfaces;
(b) one or more dongle application functions transmitting and receiving one or more application data streams including a dongle video application;
(c) wherein the dongle video application including a conversion engine the dongle video application transmitting one or more upstream video streams to and receiving one or more downstream video streams from the one or more dongle communication interfaces;
(d) a dongle management function managing one or more application data streams and controlling admission of a dongle video traffic stream originating from the device to one or more dongle communication interfaces wherein the dongle management function manages a set of video traffic streams that includes one or more upstream video traffic streams and one or more downstream video traffic streams, and the dongle management function configures one or more upstream video traffic streams as first priority based on one or more management commands received from the node management function in a network node;
(e) a dongle common operating system performing resource management and coupled to the one or more dongle communication interfaces, the dongle video application and the dongle management function.

42. The device of claim 41, wherein the dongle management function are selected from the group consisting of priority, policing, traffic shaping, scheduling, admission control, authentication functions and dynamic administration one or more service level agreements.

43. The system of claim 41, wherein the dongle management function is dynamically configured to implement quality-of-service requirements.

44. The device of claim 41, wherein the device receives a dongle management function application from one of the one or more dongle communication interfaces and activates the dongle management function.

45. The device of claim 41, wherein the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

46. The device of claim 45, wherein the device receives registration data and first configuration data including a first peak data rate and a first mean data rate for a first end point device of one or more end point devices from the one or more dongle communication interfaces and allocates the first peak data rate and the first mean data rate to one or more dongle communication interfaces based on one or more types of traffic flowing across the wireless communication network and one or more wireless communication network requirements.

47. The device of claim 46, wherein the device receives second configuration data from one or more communication interfaces including a second peak data rate and a second mean data rate and reallocating a second peak data rate and a second mean data rate to the one or more dongle communication interfaces based on a change in characteristics of the one or more types of traffic flowing across the wireless communication network and a change in one or more wireless communication network requirements.

48. The device of claim 45, wherein the dongle management function implements strict priority scheme to manage one or more dongle application traffic streams.

49. The device of claim 45, wherein the device implements a time division multiplexing scheme on video traffic bandwidth such that one or more video traffic streams are assigned a time slot in the time division multiplexing scheme for transmission through the one or more dongle communication interfaces.

50. The device of claim 49, wherein a time slot allocated to an inactive video traffic stream is reallocated to one or more active application data streams.

51. The device of claim 41, further comprising a terminal device traffic manager coupled to the device, the terminal device traffic manager performing traffic scheduling and having:
(a) a management protocol processor that receives one or more data packets from one or more dongle communication interfaces, traps one or more management protocol packets, processes the one or more management protocol packets, and executes instructions received to reallocate wireless communication network bandwidth based on processing the one or more management protocol packets, and verifies a quality-of-service for one or more transmission packets;
(b) a traffic policer verifying one or more traffic streams conforming to a respective service level agreement and performing traffic shaping on the one or more traffic streams using a queue;
(c) a scheduler engine that provides weighted round robin scheduling on scheduled traffic stream wherein weighted random early discard is performed based on excessive queue depth;
(d) a management protocol responder generating one or more control packets for management function and responding to one or more trapped management protocol packets.

52. The device of claim 41, wherein the dongle management function performs a security function using a pseudo-random code to encrypt an secured traffic stream wherein a key associated with the pseudo-random code is dynamically configured.

53. The device of claim 41, wherein the one or more application data streams is selected from the group consisting of voice traffic, video traffic, best effort data traffic, and background data traffic.

54. A method for managing one or more types of traffic over a wireless communication network, the method comprising:
(a) transmitting and receiving one or more application data streams including a node video application wherein the node video application includes a conversion engine, the node video application in a network node transmitting one or more downstream video streams and receiving one or more upstream video streams;
(b) managing one or more node video traffic streams and the one or more application data streams using a master controller function and a node management function in the network node, transmitting the one or more downstream video streams and the one or more application data streams and receiving one or more upstream video data streams across the wireless communication network;
(c) receiving an authentication request from a node communication interface and transmitting an admission control response to the node communication interface using the master controller function and the node management function in the network node;
(d) a first terminal device traffic manager performing traffic scheduling and having:
a management protocol processor that receives one or more data packets, traps one or more management protocol packets, processes the one or more management protocol packets, and transmits instructions to a wireless dongle to reallocate wireless communication network bandwidth based on processing the one or more management protocol packets, and verifies a quality-of-service for one or more transmission packets;
a traffic policer verifying one or more traffic streams conforming to a respective service level agreement and performing traffic shaping on the one or more traffic streams using a queue;
a scheduler engine that provides weighted round robin scheduling on scheduled traffic stream wherein weighted random early discard is performed based on excessive queue depth; and
a management protocol responder generating one or more control packets for management function and responding to one or more trapped management protocol packets.

55. The method of claim 54, wherein the node management function is selected from the group consisting of priority, policing, traffic shaping, scheduling, admission control, authentication functions and dynamic administration of one or more service level agreements.

56. The method of claim 54, the method further comprising transmitting configuration information to the node communication interface by the node management function, the configuration information including quality-of-service requirements.

57. The method of claim 54, the method further comprising transmitting provisioning information for a dongle management function application to node communication interface using the master controller and node management function.

58. The method of claim 54, wherein the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

59. The method of claim 58, the method further comprising:
(a) transmitting registration information for a first end point device of the one or more end point devices to the node communication interface; and
(b) transmitting allocation information to the node communication interface, the allocation information including a first peak data rate and a first mean data rate for the first end point device for transmission of data based on one or more types of traffic flowing across the wireless communication network and one or more wireless communication network requirements.

60. The method of claim 59, the method further comprising transmitting reallocation information, including a second peak data rate and a second mean data rate to the one or more node communication interface for the first end point device for transmission of data based on a change in characteristics of the one or more types of traffic flowing across the wireless communication network and a change in one or more wireless communication network requirements.

61. The method of claim 58, the method further comprising:
(a) controlling allocation of application data streams to available wireless communication network bandwidth based on traffic type and characteristics of the application data streams using the master controller function and the node management function;
(b) allocating a video traffic bandwidth that is a subset of the wireless communication network bandwidth for one or more video traffic streams using the node management function;
(c) implementing a time division multiplexing scheme on the video traffic bandwidth using the node management function such that each of the one or more video traffic streams are assigned a time slot in the time division multiplexing scheme.

62. The method of claim 61, the method further comprising allocating a time slot for an inactive video traffic stream to one or more active application data streams.

63. The method of claim 54, the method comprising performing a security function using a pseudo-random code to encrypt an secured traffic stream using the node management function wherein a key associated with the pseudo-random code is dynamically configured.

64. The method of claim 54, wherein the one or more end point devices are selected from the group consisting of a personal computer, smartphone, electronic reader, television, video camera, and a wireless enabled appliance.

65. The method of claim 54, wherein the one or more application data streams is selected from the group consisting of voice traffic, video traffic, best effort data traffic, and background data traffic.

66. A method for managing one or more types of traffic over a wireless communication network, the method comprising:
(a) transmitting and receiving one or more application data streams using a dongle management function in a wireless dongle including a dongle video application wherein the dongle video application includes a conversion engine, the dongle video application transmitting one or more upstream video stream to and receiving one or more downstream video streams from one or more dongle communication interfaces; and
(b) managing one or more application data streams and controlling admission to a dongle video traffic stream originating from the wireless dongle to one or more dongle communication interfaces using a dongle management function;
(d) managing a set of video traffic streams that includes one or more upstream video traffic streams and one or more downstream video traffic streams using the dongle management function;
(e) configuring one or more video traffic streams as first priority based on one or more management commands received and sent from a network node;
wherein the one or more types of traffic includes voice traffic corresponding to a first priority, video traffic corresponding to a second priority, best effort data traffic corresponding to a third priority, and background data traffic corresponding to a fourth priority, wherein a priority of the one or more types of traffic is dynamically configured to conform to quality-of-service requirements.

67. The method of claim 66, wherein the dongle management function is selected from the group consisting of priority, policing, traffic shaping, scheduling, admission control, authentication functions and dynamic administration of one or more service level agreements.

68. The method of claim 66, the method further comprising dynamically configuring the dongle management function to implement quality-of-service requirements received from the one or more dongle communication interfaces.

69. The method of claim 66, the method further comprising receiving a dongle management function application from the one or more dongle communication interfaces and activating the dongle management function.

70. The method of claim 66, the method further comprising:
   (a) transmitting an authentication request to one or more dongle communication interfaces;
   (b) receiving registration data and first configuration data for a first end point device of one or more end point devices from one or more dongle communication interfaces wherein the first configuration data includes the a first peak data rate and a first mean data rate; and
   (c) allocating the first peak data rate and the first mean data rate for the first end point device for transmission of data based on one or more types of traffic flowing across the wireless communication network and one or more wireless communication network requirements.

71. The method of claim 70, the method further comprising receiving second configuration data including a second peak data rate and a second mean data rate from the one or more dongle communication interfaces and reallocating the second peak data rate and the second mean data rate for the first end point device for transmission of data based on a change in characteristics of the one or more types of traffic flowing across the wireless communication network and a change in one or more wireless communication network requirements.

72. The method of claim 66, the method further comprising implementing strict priority scheme to manage one or more dongle application traffic streams.

73. The method of claim 66, the method further comprising implementing a time division multiplexing scheme on video traffic bandwidth such that each of one or more video traffic streams are assigned a time slot in the time division multiplexing scheme for transmission through one or more dongle communication interfaces.

74. The method of claim 66, further comprising performing traffic scheduling with a terminal device traffic manager coupled to the wireless dongle, the terminal device traffic manager having:
   (a) a management protocol processor that receives one or more data packets from one or more dongle communication interfaces, traps one or more management protocol packets, processes the one or more management protocol packets, and executes instructions received to reallocate wireless communication network bandwidth based on processing the one or more management protocol packets, and verifies a quality-of-service for one or more transmission packets;
   (b) a traffic policer verifying one or more traffic streams conforming to a respective service level agreement and performing traffic shaping on the one or more traffic streams using a queue;
   (c) a scheduler engine that provides weighted round robin scheduling on scheduled traffic stream wherein weighted random early discard is performed based on excessive queue depth;
   (d) a management protocol responder generating one or more control packets for management function and responding to one or more trapped management protocol packets.

75. The method of claim 66, the method comprising performing a security function using a pseudo-random code to encrypt a secured traffic stream using the dongle management function wherein a key associated with the pseudo-random code is dynamically configured.

76. The method of claim 66, wherein the one or more end point devices are selected from the group consisting of a personal computer, smartphone, electronic reader, television, video camera and a wireless enabled appliance.

77. The method of claim 66, wherein the one or more application data streams is selected from the group consisting of voice traffic, video traffic, best effort data traffic, and background data traffic.

\* \* \* \* \*